(12) United States Patent
Paraschiv et al.

(10) Patent No.: US 11,924,117 B2
(45) Date of Patent: Mar. 5, 2024

(54) AUTOMATED LOCAL SCALING OF COMPUTE INSTANCES

(71) Applicant: Amazon Technologies, Inc., Seattle, WA (US)

(72) Inventors: Andra-Irina Paraschiv, Braila (RO); Matthew Shawn Wilson, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/154,769

(22) Filed: Jan. 13, 2023

(65) Prior Publication Data

US 2023/0155957 A1 May 18, 2023

Related U.S. Application Data

(63) Continuation of application No. 16/737,780, filed on Jan. 8, 2020, now Pat. No. 11,558,311.

(51) Int. Cl.

| | |
|---|---|
| *H04L 47/78* | (2022.01) |
| *G06F 9/38* | (2018.01) |
| *G06F 9/455* | (2018.01) |
| *H04L 47/70* | (2022.01) |
| *H04L 47/762* | (2022.01) |

(52) U.S. Cl.
CPC .......... *H04L 47/782* (2013.01); *G06F 9/3877* (2013.01); *G06F 9/45558* (2013.01); *H04L 47/762* (2013.01); *H04L 47/828* (2013.01); *G06F 2009/45562* (2013.01); *G06F 2009/45566* (2013.01); *G06F 2009/4557* (2013.01); *G06F 2009/45595* (2013.01)

(58) Field of Classification Search
CPC ....... G06F 9/45558; G06F 2009/45562; G06F 2009/45575; H04L 47/765
See application file for complete search history.

(56) References Cited

U.S. PATENT DOCUMENTS

| | | | |
|---|---|---|---|
| 8,479,196 B2 | 7/2013 | Day, II et al. | |
| 8,484,639 B2 | 7/2013 | Huang et al. | |
| 8,490,090 B2 | 7/2013 | Ben-Yehuda et al. | |
| 8,819,677 B2 | 8/2014 | Day, II et al. | |
| 8,943,489 B1 * | 1/2015 | Qu | G06F 8/656 |
| | | | 717/172 |
| 9,021,459 B1 * | 4/2015 | Qu | G06F 11/1484 |
| | | | 710/33 |

(Continued)

OTHER PUBLICATIONS

Wikipedia, "Memory ballooning", Retrieved from https://en.wikipedia.org/wiki/Memory_ballooning, Oct. 10, 2019, pp. 1.

(Continued)

*Primary Examiner* — Douglas B Blair
(74) *Attorney, Agent, or Firm* — Robert C. Kowert; Kowert, Hood, Munyon, Rankin & Goetzel, P.C.

(57) ABSTRACT

At a first compute instance run on a virtualization host, a local instance scaling manager is launched. The scaling manager determines, based on metrics collected at the host, that a triggering condition for redistributing one or more types of resources of the first compute instance has been met. The scaling manager causes virtualization management components to allocate a subset of the first compute instance's resources to a second compute instance at the host.

20 Claims, 11 Drawing Sheets

(56) References Cited

U.S. PATENT DOCUMENTS

| | | | |
|---|---|---|---|
| 9,122,509 B2 | 9/2015 | Deng et al. | |
| 9,122,549 B2* | 9/2015 | Canton | G06F 9/45558 |
| 9,342,343 B2 | 5/2016 | Sonnek | |
| 10,162,657 B2 | 12/2018 | Fukushima | |
| 11,360,824 B2* | 6/2022 | Paraschiv | G06F 9/45558 |
| 11,558,311 B2 | 1/2023 | Paraschiv et al. | |
| 2011/0047544 A1 | 2/2011 | Yehuda et al. | |
| 2011/0153909 A1 | 6/2011 | Dong | |
| 2014/0229943 A1 | 8/2014 | Tian et al. | |
| 2015/0339150 A1* | 11/2015 | Yanagisawa | G06F 9/45558 718/1 |
| 2016/0246633 A1* | 8/2016 | Tsirkin | G06F 9/45558 |
| 2016/0335111 A1* | 11/2016 | Bruun | H04L 41/50 |
| 2017/0147382 A1* | 5/2017 | Folco | G06F 9/45558 |
| 2019/0340031 A1 | 11/2019 | Ganteaume | |
| 2019/0392150 A1* | 12/2019 | Shevade | H04L 61/2517 |
| 2020/0007460 A1 | 1/2020 | Guim Bernat et al. | |
| 2020/0159555 A1* | 5/2020 | Liguori | G06F 9/45558 |
| 2020/0162332 A1* | 5/2020 | Liguori | G06F 9/4416 |
| 2020/0174821 A1* | 6/2020 | Iliopoulos | G06F 9/5027 |
| 2020/0183724 A1* | 6/2020 | Shevade | G06F 9/5016 |
| 2021/0157652 A1* | 5/2021 | Paraschiv | G06F 9/4843 |
| 2021/0303356 A1* | 9/2021 | Tsirkin | G06F 9/45558 |
| 2022/0308907 A1* | 9/2022 | Junior | G06F 9/5027 |
| 2023/0043929 A1* | 2/2023 | Tsirkin | G06F 11/1402 |
| 2023/0185593 A1* | 6/2023 | Tsirkin | G06F 9/45558 718/1 |
| 2023/0315503 A1* | 10/2023 | Lu | G06F 16/256 718/1 |

OTHER PUBLICATIONS

Microsoft Docs, "Run Hyper-V in a Virtual Machine with Nested Virtualization", Retrieved from https://docs.microsoft.com/en-us/virtualization/hyper-v-on-windows/user-guide/nested-virtualization, Oct. 10, 2019, pp. 1-8.

Altaro, "VMware Hot-Add: How and When to Use it", Retrieved from https://www.altaro.com/vmware/vmware-hot-add/, Oct. 23, 2019, pp. 1-6.

Kourai, Kenichi, et al., "Seamless and Secure Application Consolidation for Optimizing Instance Deployment in Clouds," 2016 IEEE 8th International Conference on Cloud Computing Technology and Science (Cloudcom), Dec. 12, 2016, pp. 318-325, IEEE.

International Search Report and Written Opinion from PCT/US2021/012140, dated Mar. 31, 2021, Amazon Technologies, Inc., pp. 1-17.

* cited by examiner

AUTOMATED LOCAL SCALING OF COMPUTE INSTANCES

BACKGROUND

This application is a continuation of U.S. patent application Ser. No. 16/737,780, filed Jan. 8, 2020, which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines (also known as compute instances) hosted by the single virtualization host. Each such compute instance may represent a software simulation acting as a distinct logical computing system that provides users with the illusion that they are the sole operators of a given hardware computing resource, while also providing application isolation and security among the various compute instances. Instantiating several different compute instances on the same host may also help increase the overall hardware utilization levels at a data center, leading to higher returns on investment.

In some cases, a virtualized computing service may enable clients to choose from among a variety of pre-defined categories of compute instances. Such categories may, for example, differ from one another along dimensions such as compute power, memory, storage, support for specific kinds of virtualization techniques and the like. Instances of each category may be set up at the request of clients using a set of standardized virtualization servers selected by the operators of the virtualized computing service.

Figure 1:
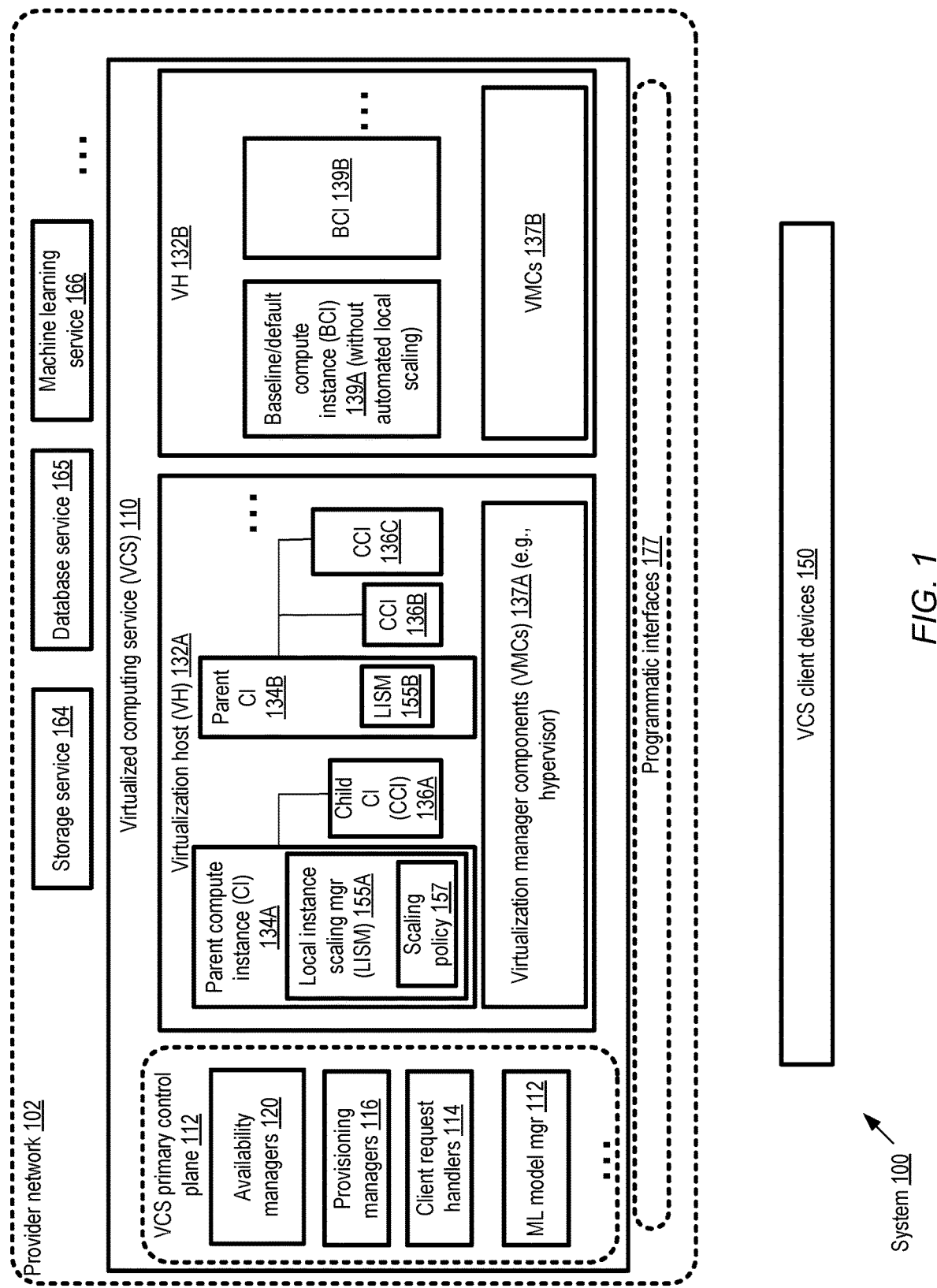
FIG. 1 illustrates an example system environment in which a local instance scaling manager set up within a compute instance of a virtualized computing service may initiate dynamic resource redistributions among a family of compute instances based on customizable scaling policies, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing automated local policy-driven redistribution of resources among parent and child compute instances at a given virtualization host of a virtualized computing service. Such techniques may be referred to as "local scaling" of the compute instances, as policy-driven resource redistribution operations may be initiated locally at the host (e.g., without specific requests from the control plane of the service for each redistribution action), and the redistributions may enable applications running at the host to scale up or down as request workload levels change. A compute instance such as a virtual machine may be instantiated at a virtualization host of the service on behalf of a client, and allocated a set of resources (e.g., CPUs, memory, storage, etc.), based for example on a resource specification of a particular category of a set of pre-defined instance categories of the service. Depending on the needs of the applications of the client, it may be beneficial from the client's perspective to redistribute the resources of the compute instance among multiple compute instances—e.g., one or more "child" compute instances may be set up on the same virtualization host using respective subsets of the resources of the "parent" compute instance. As used herein, the parent compute instance refers to the instance initially assigned the host resources, and a child compute instance refers to a new instance spawned on the host using a redistributed subset of the resources of the parent. The assigned and redistributed host resources can include one or more of compute (e.g., central processing units and/or graphics processing units or other types of special purpose processors), networking, memory, and storage.

Such redistribution may be useful for a number of reasons: for example, to implement parallelized applications for which varying-sized pools of compute instances may be configured as worker nodes at different points in time, to process computational tasks with varying resource requirements, to provide separation of functionality (by dedicating individual child compute instances to respective types of operations such as network message processing, storage service accesses and the like), to perform some types of computations in a highly secure environment (such as isolated child compute instances that are not permitted to communicate over a network and are thus less susceptible to network attacks), and so on. Instead of requesting the redistribution of the resources manually every time, the client may prefer to specify one or more customizable policies (e.g., collections of rules describing the resource redistributions desired) which can be used to automatically initiate the resource redistributions.

A local instance scaling manager (LISM), e.g., comprising one or more user-mode processes, may be set up within a parent compute instance to facilitate such automated rule-driven resource redistributions in at least some embodiments. The local instance scaling manager may perform some or all of the following types of tasks in various embodiments: (a) obtaining and parsing a client-selected local scaling policy governing the redistribution of resources, (b) collecting or obtaining metrics of various kinds (such as resource utilization levels, arrival rates of service requests being processed, and so on) indicated in the scaling policy with respect to the parent compute instance and/or any child compute instances that have already been set up, (c) processing the collected metrics to determine whether triggering conditions indicated in the policy for resource redistribution have been met, and (d) automatically initiating the types of resource redistributions indicated in the scaling policies when triggering conditions are met. Examples of operations initiated by the LISM may include causing new child compute instances to be launched with respective subsets of the parent compute instance's resources, causing modifications of the currently-allocated resource sets of one or more child compute instances or the parent compute instance, causing child compute instances to be terminated (with their resources being returned or re-allocated to the parent compute instance), and so on. A scaling (or automatic scaling, "autoscaling") policy used by the LISM may be referred to in various embodiments as a scaling rule, autoscale rule, autoscaling rule, or autoscaling configuration. A set (e.g., one or more) of compute instances managed by such an scaling policy can be referred to in various embodiments as an autoscaling group, scaling group, virtual machine scale set, auto scale instance group, managed instance group, instance pool, or backend set.

As indicated above, the redistribution-related operations performed by the LISM may be referred to as "local" scaling operations in various embodiments because once the scaling policies have been received at or determined by the LISM, further communications with control plane components of the virtualized computing service (VCS) (or other VCS components) may not be required to implement the policies. For example, there may be no requirement to identify a host for a child compute instance launched based on the policy, as the child compute instance would be launched at the same virtualization host as its parent. A given parent compute instance and the set of one or more child compute instances set up using the parent's resources may collectively be referred to as an "instance family" in various embodiments.

As one skilled in the art will appreciate in light of this disclosure, certain embodiments may be capable of achieving various advantages, including some or all of the following: (a) substantially improving the overall performance of certain types of applications run at a VCS, e.g., by dynamically adjusting the combinations of compute instances set up at individual virtualization hosts as the needs of the applications change; (b) improving the user experience of clients that wish to run such applications, e.g., by reducing the number of interactions required to manage complex applications with time-varying needs and supporting the ability to set up custom resource configurations for child compute instances; (c) reducing the amount of networking and other resources utilized to configure a collection of compute instances required for a client's applications, e.g., by using local resource management mechanisms and hence eliminating at least some interactions with the primary control plane servers of a VCS, and/or (d) enhancing the security of sensitive computations, by enabling dedicated isolated child compute instances to be set up for such computations automatically.

Custom local scaling of the kind introduced above may be supported at the computing platforms of a VCS within data centers or other premises of a provider network in at least some embodiments. A VCS may also be referred to as an elastic compute service, virtual machines service, computing cloud service, compute engine, and cloud compute, in various implementations. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

According to at least some embodiments, a system may comprise one or more computing devices of a cloud provider network. The computing devices may include instructions that upon execution on or across one or more processors cause the computing devices to allocate a set of resources of a virtualization host to a parent compute instance. The parent compute instance may be launched by, and the resources may be allocated by, one or more virtualization management components (VMCs) such as a hypervisor running at the virtualization host in some embodiments. The set of resources may, for example, include one or more virtual processors and a portion of memory. Within the parent compute instance, a local instance scaling manager (LISM) may be launched, e.g., comprising one or more user-mode and/or kernel-mode processes in various embodiments. The LISM may obtain (e.g., via one or more programmatic interfaces) a scaling policy indicated by the VCS client on whose behalf the parent compute instance is established. The scaling policy may be associated with, and indicate resource redistribution requirements for, a family of compute instances (including the parent compute instance) of the virtualization host in at least some embodiments. In some embodiments the VCS may provide example scaling policies and/or templates for scaling policies via programmatic interfaces, and the VCS client may utilize the examples or templates to create and submit custom policies to the VCS. In some cases, a client may approve the use of an example policy provided by the VCS without customizing the policy. In at least one embodiment, an easy-to-use policy editing tool may be provided by the VCS, enabling clients to easily generate policies which meet the VCS's syntax requirements for the scaling policies. Any of a wide variety of formats or languages may be used for the scaling policies, such as JSON (JavaScript Object Notation), XML (Extensible Markup Language) and the like.

The LISM may determine, based at least in part on one or more metrics collected at one or more compute instances including the parent compute instance, that a triggering condition of the scaling policy for a resource redistribution (which involves, for example, instantiating a child compute instance) has been met. In some cases the metrics may indicate that a new process, required to be run based on application needs/conditions specified in the scaling policy, should preferably or necessarily be launched within a child compute instance. The LISM may send one or more requests or commands which cause the VMCs to implement the triggered resource redistribution in various embodiments. For example, in response to the LISM's request(s), a child compute instance (CCI) of the parent compute instance may be launched by a hypervisor, and subset of the parent compute instance's resources (e.g., one or more virtual processors or a sub-portion of the memory portion allocated to the parent compute instance) may be assigned or allocated to the CCI in accordance with the scaling policy. Note that the resource redistribution may not require any additional interactions with the client in at least some embodiments— e.g., in the case where a child compute is launched, a launch request specifically for the child compute instance may not have to be submitted by the client or received at the provider network. Similarly, no specific requests from the VCS control plane may be required to trigger the resource redistribution in such embodiments. The resource redistribution may be accompanied by communication-related setup operations in at least some embodiments—e.g., the LISM may cause one or more communication channels to be established between a CCI and one or more other entities such as the parent compute instance. The scaling policy may specify the numbers and kinds of communication channels to be set up in one embodiment. One or more applications, selected by the client, may be executed at a CCI set up as a result of the scaling policy in various embodiments.

The scaling policy specified or selected by the client may comprise a number of elements in various embodiments, including for example specifications of the triggering conditions to be used for initiating resource redistributions. A triggering condition specification may in turn indicate one or more resources to be monitored, one or more request types (directed to the one or more compute instances) whose rates or other properties are to be monitored, time windows (e.g., "the last 30 minutes") for which the metrics are to be collected and analyzed to determine whether to initiate a redistribution, and so on. A variety of different metrics may be collected to evaluate the triggering conditions in different embodiments, including but not limited to metrics pertaining to compute resource usage (e.g., usage of general-purpose CPUs/cores, GPUs, application-specific processing units such as processors optimized for specific types of machine learning tasks, etc.), memory usage, network usage, storage device usage and/or request workload.

In at least one embodiment, a scaling policy may also indicate the manner in which service requests directed to the family of compute instances (comprising the parent compute instance and one or more child compute instances (CCIs) of that parent which are spawned) are to be distributed. For example, for certain types of parallelizable applications or application stages, a pool of CCIs with similar resource capacities may be launched for at least a time interval based on a scaling policy, and respective subsets of the service requests received during the time interval may be (approximately) equally distributed among the members of the pool. In one implementation, the service requests may be received at the parent CI, and the parent CI may then use respective local communication channels set up for various CCIs to pass on the service requests to the CCIs for processing. In at least one embodiment, a client may specify a machine image which is to be used for a CCI; for example, identifiers of various pre-created machine images to be used for various CCIs launched in accordance with the triggering conditions of the scaling policy may also be included in the scaling policy. In at least one embodiment, the VCS may perform one or more validation checks on a specified machine image before utilizing it to launch a CCI. In some embodiments, one or more of the following kinds of preparatory operations may be performed at the VCS with respect to machine images for CCIs. An image format header may indicate the expected formats of various sections of the image in one embodiment, and the VCS may ensure that the sections are correctly formatted according to the header information. A machine image to be used for a CCI may be signed cryptographically, and the signer's identity and authenticity as well as the integrity of the image may be verified. In at least some implementations the machine image may be encrypted, and the VCS may decrypt the image before using it for launching a CCI.

In at least one embodiment, a client may indicate exceptions in a scaling policy. Such exceptions may be used by the LISM to in effect override the triggering rules of the policy under certain circumstances. For example, an LISM may determine, at a certain point T1 in time, that a particular triggering condition for another redistribution of resources of the parent compute instance has been met. Before initiating the redistribution, however, the LISM may check whether any exceptions defined in the policy apply (for example, one such exception may indicate that no redistributions are to be performed between the hours of 10 AM and 11 AM in a particular time zone). If an exception does apply (e.g., if the time is 10:15 AM in the above example), the triggered redistribution may not be initiated. In some embodiments an exception may indicate a minimum set of resources to be kept available for the parent compute instance; if the triggered redistribution would result in such a resource limit being reached or crossed, the triggered redistribution may not be performed.

As part of a resource redistribution triggered by a client-specified policy, in at least some embodiments the number of child compute instances of a parent compute instance may be increased (by launching additional CCIs, each allocated some of the parent CI's resources) or decreased (by terminating existing CCIs and returning their resources to the parent CI). In other embodiments, instead of or in addition to changing the number of CCIs, the amount of resources of one or more types which are allocated to a given CCI may be dynamically increased or decreased. In one embodiment, based on the scaling policy, the state of a CCI may be stored, e.g., to persistent storage in the form of a snapshot, and the snapshot may later be used to launch another CCI (e.g., with a modified resource allocation relative to the CCI whose state was saved). Metadata generated and stored for such a snapshot may indicate a default set of resources to be used when launching a CCI from the snapshot in some embodiments: for example, a default amount of memory, a default number of CPUs, a default collection of networking devices, and/or a default amount of persistent storage may be indicated in the metadata. In at least one embodiment, the default set of resources may represent the minimum combination of resources needed for a CCI launched via the snapshot. In some embodiments, before performing a resource redistribution, additional resources may be allocated or acquired dynamically for the parent compute instance (after the parent compute instance has already been launched with an initial allocation of resources). For example, if a decision is made to set up a CCI to which M1 gigabytes of the parent's memory are to be allocated, M2 gigabytes of memory may be added to the running parent compute instance before the CCI is launched. In some cases, M2 may be no less than M1, while in other cases M2 may be less than M1, depending on the amount of free memory available at the virtualization host.

Any of several different techniques may be used to launch CCIs in different embodiments. In one embodiment, nested virtualization may be used, in which a second hypervisor is set up within the parent CI (i.e., a hypervisor other than the one used to launch the parent CI), and the CCI is launched using the second hypervisor. In other embodiments, a custom instance partitioning technique may be used, in which such second hypervisors are not required, and the CCIs are set up by the same hypervisor which was used to set up the parent CI. In order to facilitate efficient redistribution of parent compute instance resources using the custom instance partitioning, at least two types of additional software components may be instantiated within a virtualization host in some embodiments: a resource partitioning tool (RPT) (which may for example comprise one or more user-mode processes within a parent compute instance), and one or more instance partitioning controllers (IPCs) responsible for performing some types of administrative tasks associated with requests for child compute instances. The RPT may provide easy-to-use programmatic interfaces for requesting launches or terminations of child compute instances from within a parent compute instance (e.g., by the LISM, or by a client), for viewing the status of child compute instances, and so on. The IPCs may represent a local version of the control plane or administrative logic of the virtualized computing service, so that for example verifications/validations associated with requests for configuration of child compute instances with partitioned subsets of parent instance resources can be performed locally without over-the-network calls to remote control plane servers. Parent compute instances may also be referred to as "primary" compute instances, while child compute instances may also be referred to as "secondary", "dependent" or "non-primary" compute instances in some embodiments. When custom instance partitioning is used, the length of the software path (e.g., the number of layers of software traversed) to access hardware devices of the virtualization host from a process running within a child compute instance may be very similar to the length of the software path to access hardware from a process running within a parent compute instance. In contrast, in at least some nested virtualization techniques, multiple hypervisors may have to be traversed to access hardware devices from the nested compute instance, making such accesses less efficient. A VCS client may specify the particular CCI instantiation technique(s) to be used (e.g., nested virtualization or custom instance partitioning) in a scaling policy in at least some embodiments.

CCIs launched based on client-specified scaling policies may be used to perform any of a variety of specialized tasks in different embodiments. In one scenario, for example, a CCI may be used as an intermediary between other compute instances of the instance family to which the CCI belongs and one or more storage devices (e.g., storage devices of a network-accessible storage service of the provider network). As such, the CCI may access one or more storage devices of the storage service in response to requests from its parent CCI or other CCIs of the parent, and provide results obtained from the storage devices. In one embodiment, a CCI may similarly be used as the intermediary between the other CIs of the instance family and one or more local storage devices of the virtualization host. In one embodiment, a client may indicate, e.g., via a scaling policy parameter, that a particular CCI be prevented from communication over a network, so that for example security-sensitive computations can be performed within that CCI. Networking devices/addresses may not be set up for such a CCI in various embodiments, and only local channels of communication may be used to access the CCI (e.g., to transfer security artifacts such as cryptographic keys to the CCI for the sensitive computations, and to obtain results of such sensitive computations). Similarly, in at least some embodiments, one or more CCIs may not be provided access to persistent storage devices, to further enhance the security of applications run at such CCIs.

In some embodiments, the provider network at which automated local scaling of compute instances is implemented may support functional programming techniques for certain types of applications. In a functional programming methodology, a client of a computing service may simply specify the function or programs to be executed on the client's behalf, without acquiring any specific computing resources in advance. The service may then dynamically select appropriate computing resources, cause the function or program to be executed at the selected resources, and provide the results to the client. In at least one embodiment, based on a scaling policy, a CCI may be created to run such a function or program on demand, and the CCI may be terminated after the results of the function or program are obtained. The parent CI may include one or more functional programming orchestration managers in such embodiments, configured to receive programmatic representations of functions to be implemented to perform a computation on behalf of a client. The functional programming orchestration manager (e.g., comprising one or more processes or threads) may cause a specified function to be executed or implemented at a CCI launched for the function based on the client-selected scaling policy, and terminate the CCI after the function has been executed and results or output of the function have been collected.

In at least one embodiment, a CCI may be set up to run a software container based on a client-specified scaling policy. A software container includes the code of an application, as well as additional artifacts on which the application depends, so that the application can be run quickly and transferred reliably from one computing environment to another. The parent CI may include a container manager comprising one or more processes or threads in such embodiments. The container manager may receive an indication (e.g., a container image identifier) of the desired software container programmatically from a client, e.g., as part of the scaling policy, and cause the container to be run within a CCI launched specifically for the container.

A particular CCI may be set up as a communication hub or intermediary for some subset or all of the other CIs of the instance family in some embodiments based on a scaling policy. As such, the hub CCI may receive messages from one or more external endpoints (endpoints outside the family or outside the virtualization host), and forward the messages to the appropriate CI within the family. Similarly, the hub CCI may receive outbound messages from the other CIs of the family, and transmit them to external endpoints.

A number of different techniques may be used to automatically redistribute compute instance resources among the instances of an instance family in different embodiments. Such techniques may include, for example variants of memory ballooning, hot plugging/unplugging of memory or processors (which may also be referred to as "hot add" or "hot remove" of memory or processors), processor off-lining followed by on-lining, and so on. In one implementation of memory ballooning, a parent CI's kernel may implement a "balloon driver" which allocates unused memory within the parent CI's address space to a reserved memory pool referred to as the "balloon", so that the memory in the pool is no longer available to processes running within the parent CI itself. The physical memory mapped to the reserved pool may be unmapped from the address space of the parent CI, e.g., by the VMCs of the host, and made available to CCIs. The size of the balloon may be increased or decreased dynamically depending on the needs of the instance family. In hot unplugging techniques, resources such as processors or memory may be dynamically taken away from one compute instance (such as the parent CI) and assigned to other compute instance (such as CCIs), without taking down or halting the source instances. Similarly, processor off-lining may involve disallowing further use of a processor by a parent CI, while processor on-lining may involve assigning an off-lined processor to a CCI. After a CCI is terminated, processors that were allocated to the CCI may be returned to the parent CI in at least some embodiments, in an operation which represents the logical reversal of the processor off-lining and on-lining which were used to allocate the processors to the CCI earlier. In some embodiments, if a client wishes to overcommit resources such as processors, off-lining and on-lining may not be required, as the same resource may in effect be shared by a parent CI and one or more of its CCIs.

According to at least one embodiment, one or more machine learning models may be trained to help with automated local scaling. Such models may be used in some embodiments to predict, e.g., based on collected metrics, one or more of (a) service request arrival rates at a virtualization host and/or (b) resource usage rates at a virtualization host. Predictions generated by the models may be used to schedule automated redistribution of at least some resources among a family of compute instances at a virtualization host in some embodiments. In some embodiments, aspects of a scaling policy may be generated by such machine learning models. In one embodiment, a scaling policy indicated by a client may provide an indication of one or more machine learning models which are to be used to schedule resource redistributions. In some implementations, a machine learning model to be used for resource redistribution-related decision making at a virtualization host may be run at the virtualization host. In other implementations, such models may be trained and/or run at resources external to the virtualization host (e.g., at the control plane of the VCS).

In at least one embodiment, a view of the resource usage of various CCIs of a parent CI may be provided via one or more programmatic interfaces of the VCS. Individual ones of the CCIs may be presented as the logical equivalent of processes running within the parent CI in some implementations.

Example System Environment

FIG. 1 illustrates an example system environment in which a local instance scaling manager set up within a compute instance of a virtualized computing service may initiate dynamic resource redistributions among a family of compute instances based on customizable scaling policies, according to at least some embodiments. As shown, system 100 includes resources of a network-accessible virtualized computing service (VCS) 110 of a provider network 102. The VCS 110 may include a plurality of virtualization hosts (VHs) 132, such as 132A and 132B, which may be used to launch compute instances on behalf of VCS clients. Generally speaking, the VCS may offer virtual compute instances with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. The provider network 102 may also include a number of other network-accessible services in some embodiments, such as a storage service 164, a database service 165, a machine learning service 166, and so on, which may be accessed from the compute instances of the VCS for various types of applications as needed.

The compute instances and virtualization hosts 132 may be considered part of the data plane of the VCS 110, used primarily for client applications and associated data. In contrast to the data plane, the VCS may include a set of servers and/or other resources used for administrative tasks and referred to as the primary control plane 112 in the depicted embodiment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The primary control plane 112 may include, for example, global availability managers 120, provisioning managers 116, client request handlers 114 as well as one or more machine learning model managers 112 in the depicted embodiments. The VCS may implement one or more programmatic interfaces 177 (e.g., web-based consoles, application programming interfaces (APIs), command-line tools, graphical user interfaces and the like), which may be used by VCS users or clients to submit programmatic requests for some types of compute instances, and receive corresponding responses in the depicted embodiment. Any of a variety of types of VCS client devices 150 (e.g., laptops, desktops, mobile computing devices, etc.) may be used to submit programmatic requests via programmatic interfaces 177 in the depicted embodiment. Some implementations of the VCS can provide an API for specifying local scaling policies for compute instance resource redistributions, as described herein. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network.

Request handlers 114 of the primary control plane 112 may perform some initial checking (e.g., to verify that the client has permissions for the kinds of operations being requested), and then pass on internal versions of the request to one or more other components of the control plane for implementation. The provisioning managers 116 may, for example, be responsible for identifying a specific virtualization host (VH) 132 at which one or more compute instances are to be launched in the depicted embodiment. Availability managers 120 may be responsible for monitoring the health of various VCS resources, automatically replacing certain types of resources in the event of detected failures, and so on. In the embodiment depicted in FIG. 1, one or more machine learning models may be trained to predict resource usage and/or application request rates of at least some compute instances and/or virtualization hosts 132, and the predictions generated by such models may be used to automate resource redistribution as part of local scaling operations at the virtualization hosts. A machine learning model manager 112 may coordinate the training of such models, e.g., using the machine learning service 166 in some embodiments. In some implementations, at least some of the trained models may be deployed at the virtualization hosts 132, while in other implementations some or all of the trained models may be executed at the primary control plane 112 or at a machine learning service 166. In one embodiment, at least some machine learning models may be trained within compute instances of the virtualization hosts 132.

In the embodiment depicted in FIG. 1, the VCS may support several different categories of compute instances. Some categories may allow subsets of the resources allocated to a given compute instance running at a given virtualization host to be redistributed automatically according to client-specified policies among one or more child compute instances at the same virtualization host. Such compute instances may be referred to as parent compute instances (parent CIs). For example, at virtualization host 132A, some resources of parent CI 134A may be automatically granted to child compute instance (CCI) 136A, and respective subsets of resources of parent CI 134B may be automatically allocated to CCIs 136B and 136C. Other categories of compute instances may not support such automated redistribution of their resources, and may be referred to as baseline or default compute instances (BCIs). For example, BCIs 139A and 139B may be set up at virtualization host 132B in response to client requests. As indicated earlier, at least in some embodiments, the VCS may define a number of instance categories, distinguished from each other along various dimensions such as computing capacity, memory capacity, storage capacity, networking capacity, operating system type, virtualization techniques used, and so on. In one trivial example scenario, the VCS may support "small", "medium" and "large" compute instance categories, with medium instances having twice the computing capacity (expressed for example using standardized computing units also defined by the VCS) as small instances, and large instances having twice the computing capacity of medium instances. In one embodiment, automated policy-driven resource redistribution may be implemented for some or all of such pre-defined categories of compute instances. In other embodiments, CIs which support automated policy-driven redistribution may represent a distinct category of compute instances among the set of supported categories.

Virtualization hosts 132 may comprise respective sets of virtualization manager components (VMCs) 137 (such as hypervisors) in the depicted embodiment. VH 132A includes VMCs 137A, while VH 132B includes VMCs 137B, for example. In some embodiments, the VMCs at a given VH 132 may utilize the primary physical processors (CPUs or cores) of the VH. In other embodiments, at least a subset of virtualization management tasks may be offloaded to peripheral cards (e.g., cards connected to the primary physical processors via a peripheral bus such as a PCI (Peripheral Component Interconnect) bus or a PCIe (PCI-express) bus), so that more of the computing capacity of the primary physical processors remains available for the compute instances.

A parent CI and its CCIs may collectively be referred to as a family of compute instances in various embodiments. Thus, parent CI 134A and its CCI 136A may form one family, while parent CI 134B and its CCIs 136B and 136C may form another family in the scenario depicted in FIG. 1. To support automated redistribution of resources within a family based on client-specified policies or rules, a local instance scaling manager 155 (e.g., LISM 155A or 155B) may be launched at the parent CI in various embodiments. Depending on the specific techniques being used for resource redistribution, additional software components such as a second-level VMC within the parent compute instance, a resource partitioning tool and/or one or more instance partitioning controllers may also be launched at a virtualization host 132 in some embodiments, as discussed below in further detail. An LISM 155 may comprise one or more user mode-processes in some embodiments. In other embodiments, an LISM 155 may comprise one or more kernel-mode daemons, threads or processes, e.g., in addition to or instead of user-mode processes. VCS clients may submit requests to launch parent CIs to the primary control plane 112 in the depicted embodiment, and the requested parent CIs may be instantiated at a virtualization host 132 by the VMCs of the virtualization host. In contrast, after a parent CI 134 has been launched by the VMCs and a client-specified scaling policy 157 has been obtained at the LISM 155 of the parent CI, launches of at least some CCIs may be orchestrated locally at the virtualization host by the LISM 155, bypassing the primary control plane 112. The client-specified scaling policy 157 may indicate the triggering conditions for redistribution of the resources of a compute instance family (which may in some cases involve increasing or decreasing the total number of CCIs in that family), and the redistributions may be accomplished with the help of VMCs of the host, without requiring any additional programmatic interactions with clients or with the primary control plane in at least some embodiments.

A client's request to launch a parent CI 134 may indicate, e.g., based on a parameter identifying a pre-defined compute instance category for the parent CI 134, a set of resources to be allocated to the parent CI 134 in various embodiments. Accordingly, when the VMCs 137 instantiate a parent CI 134, the requested set of resources (virtual CPUs or processors, memory, storage etc.) may be allocated to the parent CI 134. Similarly, a set of resources may also be allocated for use by a BCI 139 by the VMCs 137 of its VH 132, based for example on the particular category of BCI requested by the client. In some embodiments, the VCS may allow a client to explicitly specify the combination of resources to be allocated to a parent CI or a BCI, instead of requiring the client to select from among a list of pre-defined instance categories with respective resource configurations.

If a client wishes to initiate automated policy-based redistribution of resources of one or more parent CIs 134, the client may submit a local scaling policy 157 via a programmatic interface in the depicted embodiment. In some embodiments, the clients may provide the scaling policy 157 directly to the LISM 155 of a parent CI 134. In other embodiments, the VCS client may wish to apply the same scaling policy for redistribution of resources of multiple parent CIs, so the policy may be sent to the primary VCS control plane and propagated from the primary control plane to a subset or all of the parent CIs set up on behalf of the client. Any of a variety of formats or languages (e.g., JavaScript Object Notation (JSON), variants of Extended Markup Language (XML), etc.) may be used to specify a scaling policy 157 in different embodiments as indicated earlier.

A scaling policy 157 may include a number of elements in various embodiments, such as descriptors of one or more triggering conditions for resource redistributions, an indication of the machine image(s) to be used for launching any CCIs needed during resource redistributions, CCI communication channel requirements, device models for the CCIs, workload distribution requirements indicating how requests messages for service requests should be distributed among the instances of the family, desired launch methodologies for CCIs (e.g., whether nested virtualization is to be used, or custom instance partitioning is to be used), and/or the types of redistribution implementation techniques (such as memory ballooning, hot-plugging of memory or processors) etc. to be used. The specifications of the triggering conditions may in turn indicate one or more metrics to be collected with respect to the family of instances to which the scaling policy applies—for example, resource utilization metrics for processors, memory etc. may be collected, service request rates directed at the family of compute instances may be collected, and so on.

According to at least some embodiments, an LISM 155 may comprise at least three types of subcomponents (e.g., implemented using respective sets of threads or processes): one or more metrics collectors, one or more metrics analyzers, and one or more policy executors. The policy executors may, for example, parse the scaling policy 157 and initiate the gathering and analysis of metrics indicated in the policy by the metrics collectors and analyzers. If the analysis indicates that at least one triggering condition for a resource redistribution is met, the policy executors may communicate with the one or more VMCs to initiate the redistribution in various embodiments. For example, if a triggering condition for instantiating a CCI and allocating a subset of the parent CI's resources to the new CCI is met, the LISM's policy executor may submit a request to a hypervisor to launch the CCI and allocate the resources to the CCI. The CCI may then be launched and the specified resources may be allocated to the CCI. Communication channels (e.g., using shared memory and/or networking devices) may be set up automatically for the CCIs based on the elements of the scaling policy in at least some embodiments. Applications for which the CCI is established may be run at the CCI, e.g., using the software included in the image indicated in the scaling policy. If and when a CCI is to be terminated based on additional metrics and triggering conditions, the LISM may coordinate with VMCs to terminate the CCI and return its allocated resources to the parent CI. In addition to or instead of launching/terminating CCIs, some redistribution operations initiated by an LISM may involve adding or removing resources from an existing running CCI or parent CI in at least some embodiments. In at least some embodiments, a client may specify exceptions for a scaling policy 157, indicating for example the circumstances under which a resource redistribution is not to be initiated even if a triggering condition for that redistribution has been met, and the LISM may abandon a potentially triggered resource redistribution based on such exceptions.

Example Changes in Family Compute Instance Counts

Figure 2:
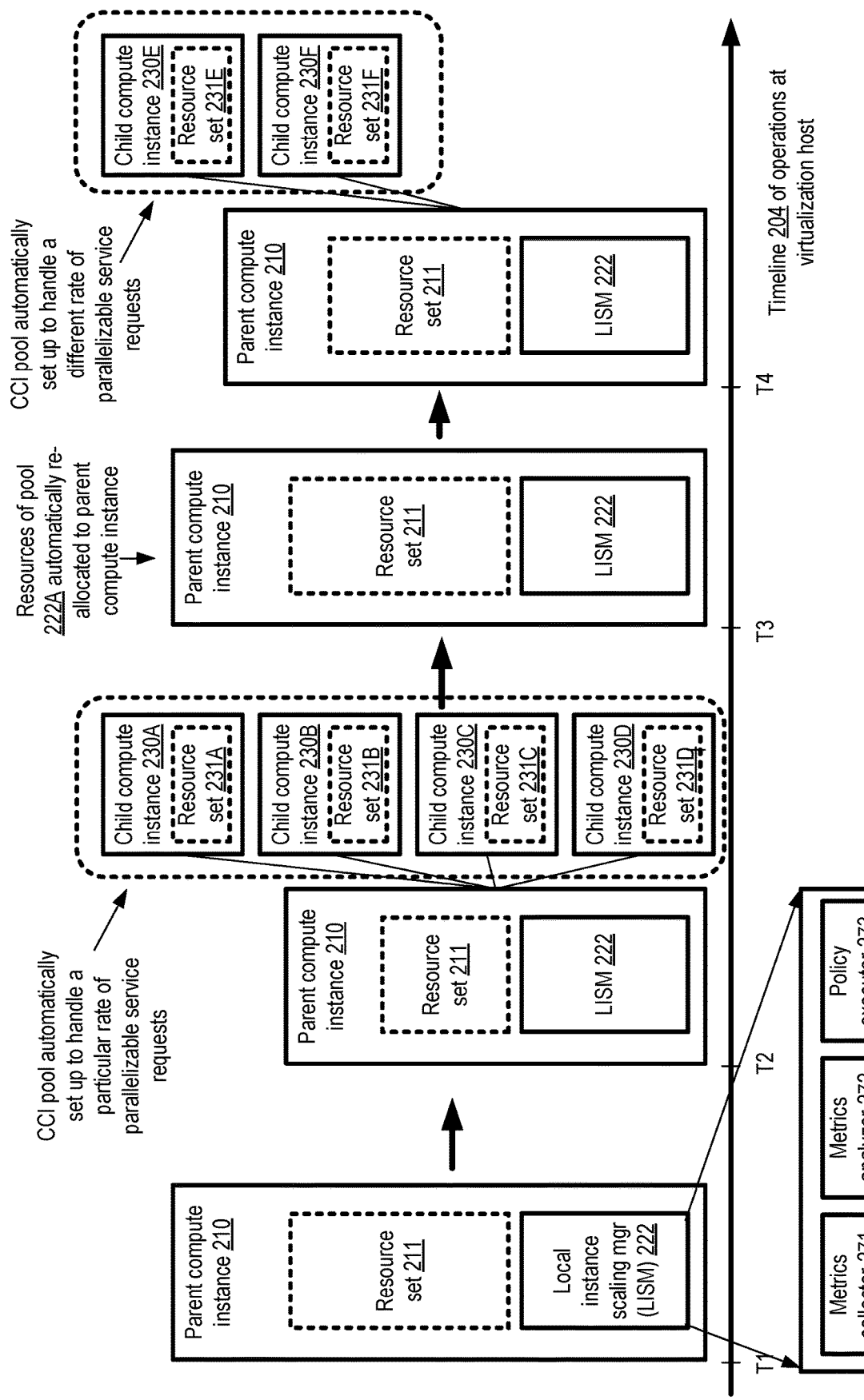
FIG. 2 illustrates an example scenario in which a local instance scaling manager may cause the number of child compute instances of a parent compute instance to be automatically modified over time based on varying workload conditions, according to at least some embodiments.

A number of different types of local resource redistributions may be implemented at a virtualized computing service (VCS) similar in functionality to VCS 110 of FIG. 1 in various embodiments. The resource redistributions may be referred to as being local because interactions with entities outside the virtualization host at which the resources are redistributed may not be required in at least some embodiments—e.g., the control plane of the VCS may not be required to approve the resource redistribution, no new servers or hosts may need to be provisioned, and so on. The local resource redistributions may help support a variety of application execution patterns, including for example a parallel programming approach in which a pool of workers is set up at some stage to perform similar tasks in parallel, and the size of the pool required may change during different phases of the application being implemented. FIG. 2 illustrates an example scenario in which a local instance scaling manager may cause the number of child compute instances of a parent compute instance to be automatically modified over time based on varying workload conditions, according to at least some embodiments.

A resource set 211 may be allocated for a parent compute instance 210 at approximately time T1 along timeline 204 of operations performed at a virtualization host in the depicted embodiment. The parent CI 210 may include a local instance scaling manager 222, which in turn may comprise at least a policy executor 273, a metrics collector 271 and a metrics analyzer 272. The policy executor 273 may obtain a local scaling policy selected by a client on whose behalf parent CI 210 is launched, which contains guidance about the manner in which resource set 211 is to be redistributed among one or more child compute instances (CCIs) of the parent CI 210 if certain conditions are met.

In accordance with the scaling policy, the metrics collector 271 may gather metrics of various kinds in the depicted embodiment, such as usage levels for compute resources, memory, network, persistent storage and the like, and/or the rates at which various types of service requests are directed at the parent CI 210 (and any child CIs of the parent). The metrics analyzer 272 may examine the metrics collected (e.g., over a recent interval whose duration is also indicated in the scaling policy) and provide its analysis results (e.g., average values, other statistics, trends, etc.) to the policy executor 273. Based on one or more triggering conditions indicated in the scaling policy, and the analysis of the metrics, the policy executor 273 may determine at approximately time T2 that a pool comprising four child compute instances (CCIs) 230A-230D is to be created. The newly launched CCIs of the pool may be allocated respective subsets of the resource set 211 so that they can collectively handle a particular rate of arriving workload requests of a parallelizable workload. In some cases, the specific number of CCIs set up may depend on an anticipated or actual rate of application or service requests directed to the parent compute instance or its family of instances. For example, consider an example situation in which 200 requests per second of a certain type are received or expected to be received during a particular time interval starting at or after T2, and then the request rate is expected to fall dramatically. Furthermore, assume that an individual CCI (whose desired resource characteristics and capabilities may be indicated in the scaling policy) can be expected to be able to handle up to 50 requests per second. In this scenario, the policy executor 273 may initiate (a) the launch of four CCIs 230A-230D at or around time T2, (b) the allocation of respective resource sets 231A-231D to the four CCIs, and (c) the establishment of communication channels (e.g., a respective shared-memory based local communication channel between each of the CCIs and the parent CI) enabling the requests to be distributed among the four CCIs.

If/when the request rate falls (as indicated by the metrics collected and analyzed by the LISM 222), the four CCIs may be terminated in the depicted example scenario, e.g., at approximately time T3, the four CCIs 230A-230D may all be terminated as they are no longer needed, and the resources 231A-231D may be restored to the parent CI 210. Later, at approximately time T4, another rise in request rates may be detected by the LISM 222. This time, only two CCIs 230E and 230F may be launched based on the scaling policy to handle a different rate of parallelizable requests than before, and respective subsets 231E and 231F of resource set 211 may be assigned to each of the CCIs. This type of pattern, in which the size of the pool of CCIs set up is automatically changed over time based on a client-specified scaling policy, may be especially useful, for example for applications whose service requests (a) can be fulfilled relatively independent of one another and so can be farmed out to multiple similar worker processes (with each CCI comprising one or more worker processes) and (b) arrive at different rates over time. Note that at least in some cases, the parallelizable requests processed using dynamically configured pools of CCIs at different stages may differ not only in the request rates, but also in the type or amount of work performed—e.g., it may not necessarily be the case that CCIs 230E/230F perform the same types of computations as CCIs 230A-230D.

Example Changes in Per-Compute Instance Resources

Figure 3:
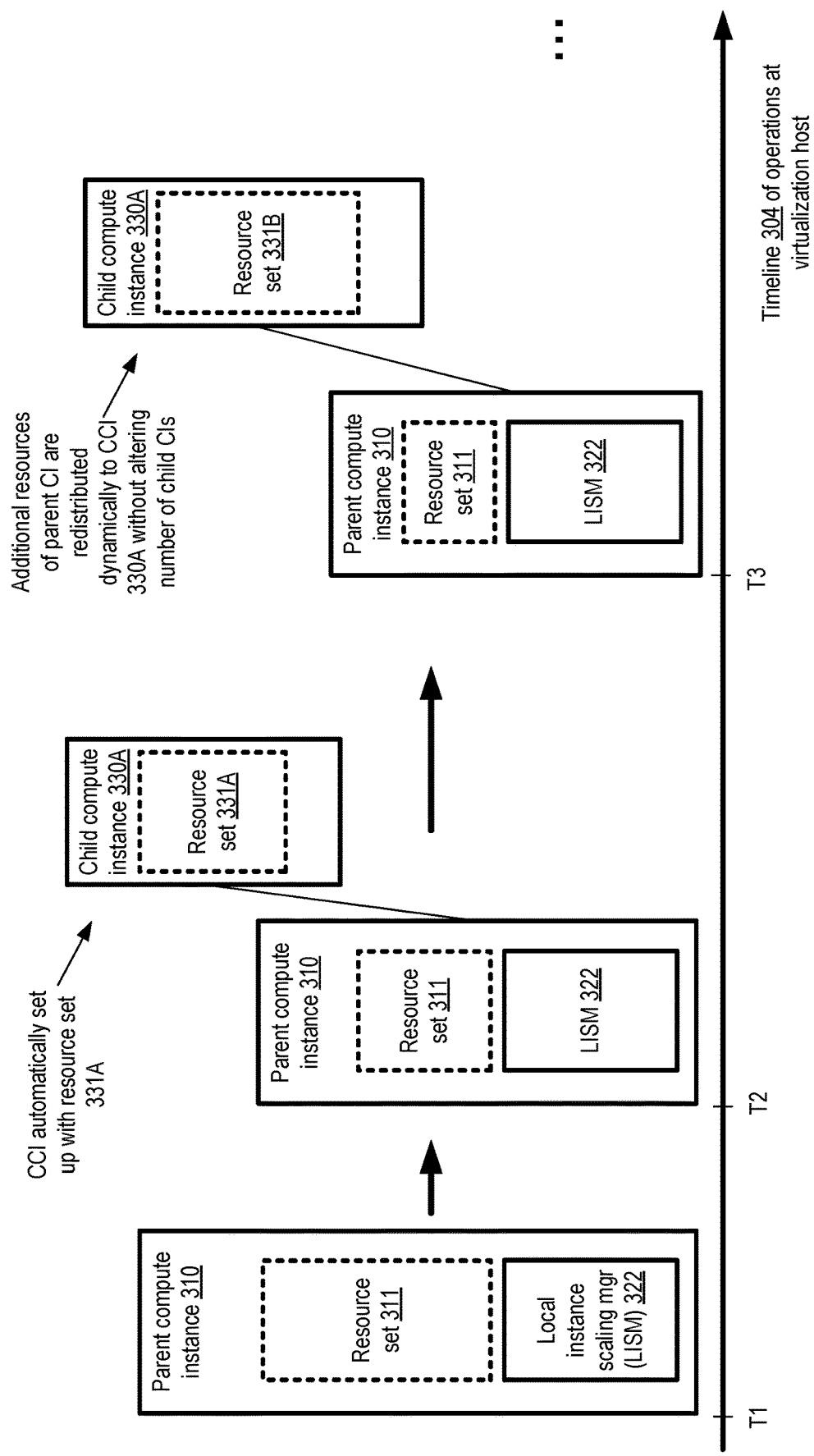
FIG. 3 illustrates an example scenario in which a local instance scaling manager may cause the set of resources allocated for a given compute instance at a virtualization host to be automatically modified based on a scaling policy, according to at least some embodiments.

In the scenario depicted in FIG. 2, the collection of resources 231 (e.g., 231A-231F) allocated to a given child compute instance (CCI) did not change after the CCI was launched; the overall distribution of resources was changed primarily by modifying the number of CCIs. FIG. 3 illustrates an example scenario in which a local instance scaling manager may cause the set of resources allocated for a given compute instance at a virtualization host to be automatically modified based on a scaling policy, according to at least some embodiments.

A resource set 311 may be allocated for a parent compute instance 310 at approximately time T1 along timeline 304 of operations performed at a virtualization host in the depicted embodiment. The parent CI 310 may include a local instance scaling manager (LISM) 322, which may be similar in features, subcomponents and functionality to LISM 222 of FIG. 2. At approximately time T2, the LISM 322 may determine that a triggering condition for launching a new CCI has been met (per the scaling policy being implemented for parent CI 310 and its family of instances), and cause CI 330A to be launched at the same host as parent CI 310. A resource set 331, representing a subset of resource set 311, may be allocated to CCI 330A.

Based at least in part on additional metrics collected and analyzed at the LISM, and the details of the scaling policy in use, at approximately time T3 the LISM may further determine that the currently-allocated resource set 331A is insufficient for the work to be performed at CCI 330A. Accordingly, the LISM may cause an additional portion of the parent CI's resource set 311 to be dynamically allocated or redistributed to the existing CCI 330A. If and when the resource requirements of CCI 330A decrease, some of its resources may be dynamically re-allocated back to parent CI 310 in the depicted embodiment, e.g., if the metrics analyzed at the LISM 322 indicate that the parent CI is running short of resources for its own tasks.

Example Use of Snapshots

Figure 4:
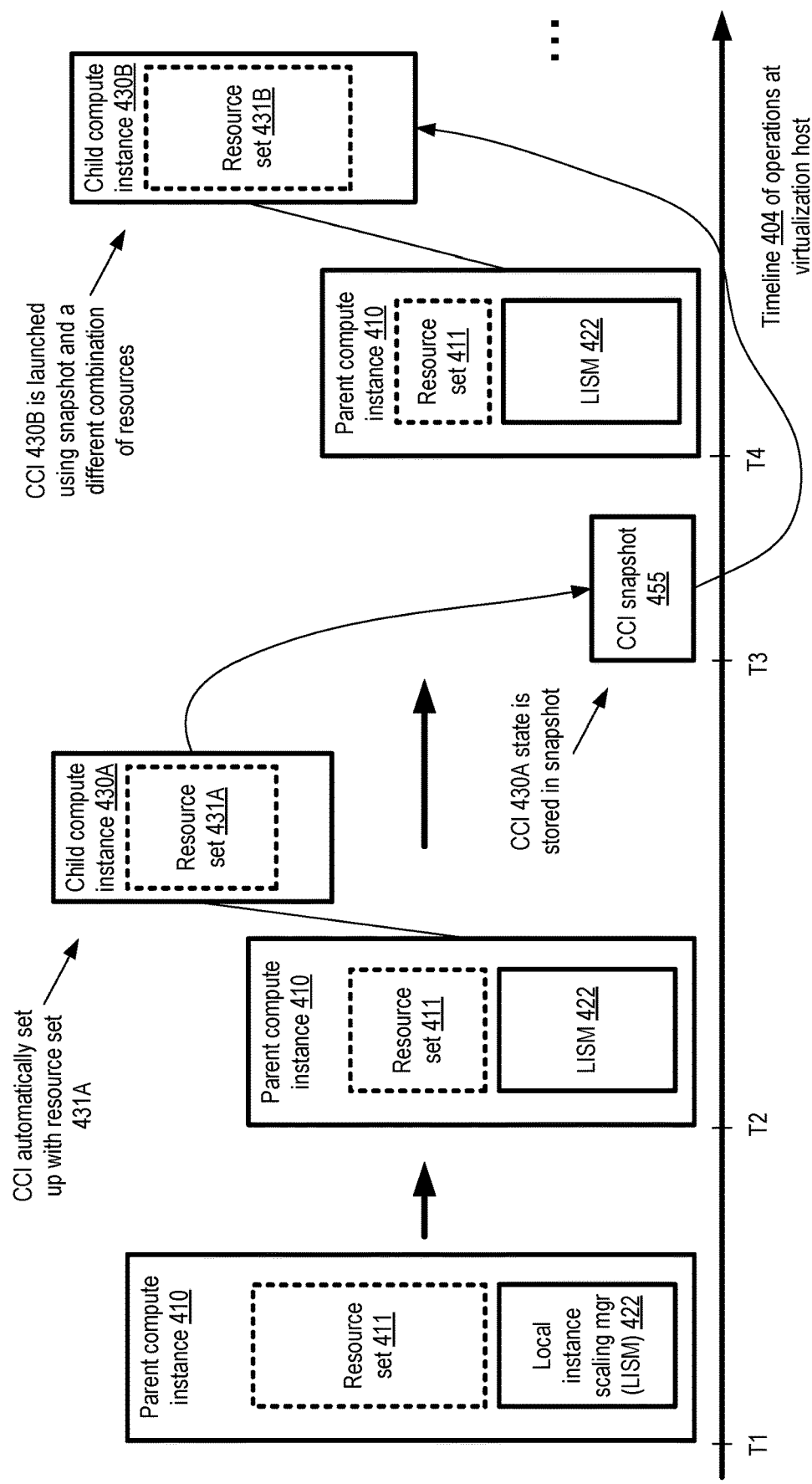
FIG. 4 illustrates an example scenario in which a local instance scaling manager may cause a child compute instance to be launched using a snapshot of instance state information, according to at least some embodiments.

In some embodiments, based for example on the kinds of applications being implemented using a family of compute instances, it may be beneficial to save or freeze the state of a child compute instance, and then later in effect resume the execution of that child instance using the saved state information as a starting point for a new instance. A VCS client may include an indication of such state-saving preferences in a local scaling policy in at least some embodiments. FIG. 4 illustrates an example scenario in which a local instance scaling manager may cause a child compute instance to be launched using a snapshot of instance state information, according to at least some embodiments.

At approximately time T1 along timeline 404 of operations performed at a virtualization host, a resource set 411 may be allocated for a parent compute instance 410 in the depicted embodiment. The parent CI 410 may include a local instance scaling manager (LISM) 422, which may be similar in features, subcomponents and functionality to LISM 222 of FIG. 2. At approximately time T2, a child compute instance (CCI) 430 may be launched based on a detection by LISM 422 of CI 410 that a triggering condition indicated in a client-supplied scaling policy has been met. A resource set 431A, carved from the parent CI's resource set 411, may be allocated to the CCI 430A in the depicted example scenario.

The scaling policy in use for parent CI 410 and its family of instances may indicate that when the measured metrics indicate that a CCI such as 430A is no longer needed, its state information (e.g., memory state, network device state, etc.) is to be saved in a snapshot object. Accordingly, at approximately time T3, CCI snapshot 455 may be generated and stored, e.g., based on one or more requests from the LISM 422 to one or more VMCs at the virtualization host.

Later, at approximately time T4, the LISM 422 may determine, based on the information provided by the client in the scaling policy and additional metrics collected, that the CCI whose state was saved in the snapshot 455 is to be resuscitated as a new instance, so that the new CCI can start performing operations similar to those being performed by the CCI 430A prior to the creation of the snapshot. Accordingly, CCI 430B may be launched using snapshot 455. In at least some embodiments, the amount of one or more resources allocated to the CCI 430B may differ from the amount that was allocated to CCI 430A—e.g., as shown, a different resource set 431B may be allocated for CCI 430B than was allocated to CCI 430A before its state was saved.

Example Dynamic Modification of Parent Compute Instance Resources

Figure 5:
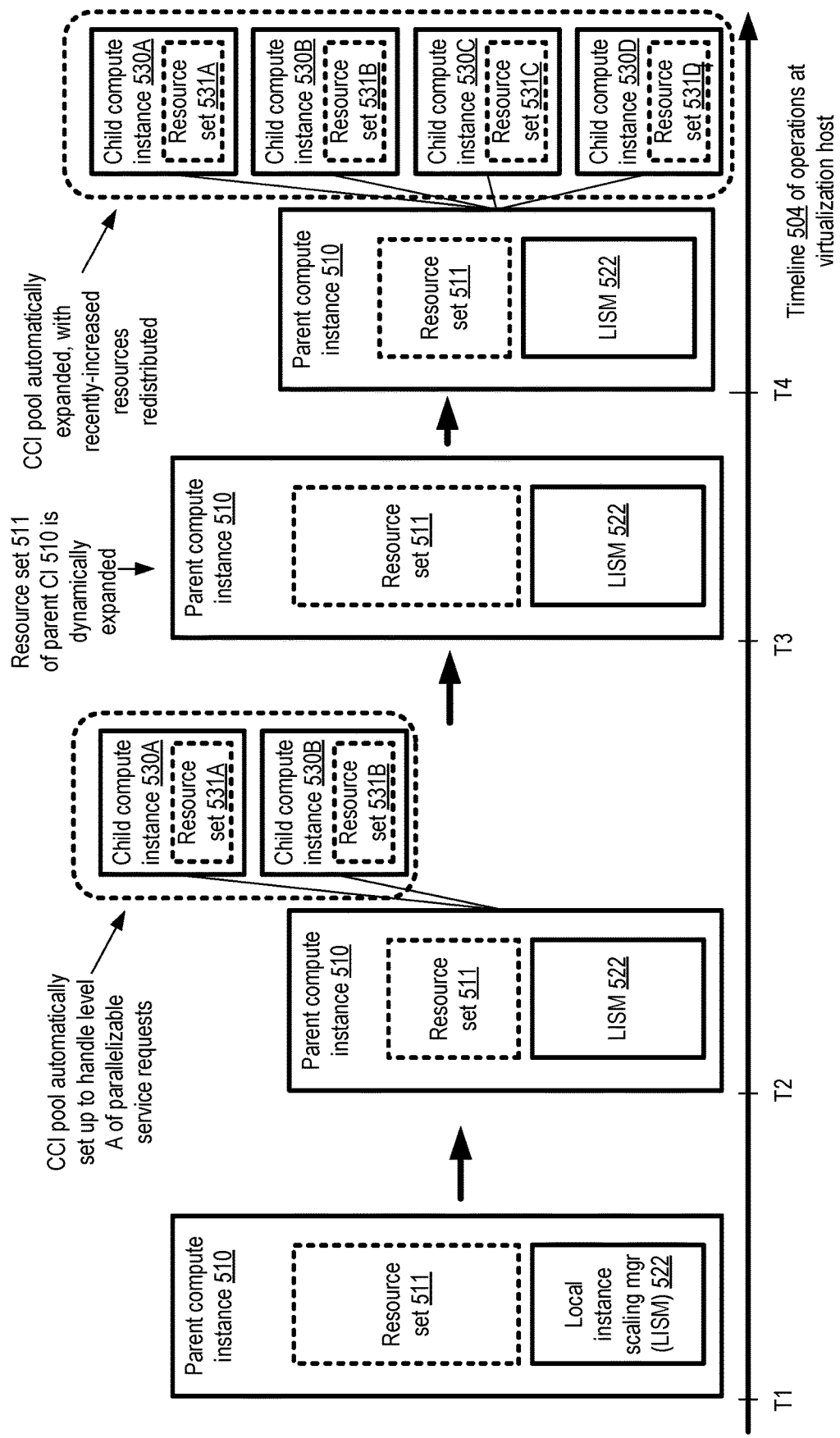
FIG. 5 illustrates an example scenario in which a local instance scaling manager may request allocation of additional resources for a parent compute instance prior to initiating the launch of child instances, according to at least some embodiments.

In some embodiments, a parent compute instance may have to retain at least a minimum amount of resources in order to perform its own portion of the application workload for which it and its CCIs are set up. Such minimum requirements for parent compute instances may also be specified in the scaling policy by a client in at least some embodiments. FIG. 5 illustrates an example scenario in which a local instance scaling manager may request allocation of additional resources for a parent compute instance prior to initiating the launch of child instances, according to at least some embodiments.

A resource set 511 may be allocated for a parent compute instance 510 at approximately time T1 along timeline 504 of operations performed at a virtualization host in the depicted embodiment. The parent CI 510 may include a local instance scaling manager (LISM) 522, which may be similar in features, subcomponents and functionality to LISM 222 of FIG. 2. At approximately time T2, the LISM 522 may determine that a triggering condition for launching a pair of new CCIs has been met (per the scaling policy being implemented for parent CI 510 and its family of instances), and cause CCIs 530A and 530B to be launched at the same host as parent CI 510. Respective resource sets 531A and 531B, each comprising a subset of resource set 511, may be allocated to CCIs 530A and 530B.

At approximately time T3, the LISM 522 may make a determination, based on the scaling policy in use, that additional resources have to be acquired for parent CI 510 itself. The additional resources may be required, for example, because the portion of the workload assigned to the parent CI has increased, and/or in anticipation that additional CCIs may have to be launched in the near future. Accordingly, the resource set 511 allocated to the parent CI 510 may be dynamically expanded, e.g., as a result of submission of one or more requests from the LISM to VMCs of the host (and/or to the VCS control plane) in the depicted embodiment. Neither the parent CI 510 nor its CCIs may have to be terminated or restarted to expand resource set 511 in at least some embodiments.

At approximately time T4, the LISM 522 may expand the CCI pool by adding two new CCIs, 530C and 530D. Some of the resources that were recently added to resource set 511 may be redistributed among the newly-created CCIs 530C and 530D—e.g., resource sets 531C and 531D may comprise portions of the newly added resources.

Example Elements of Scaling Policies

Figure 6:
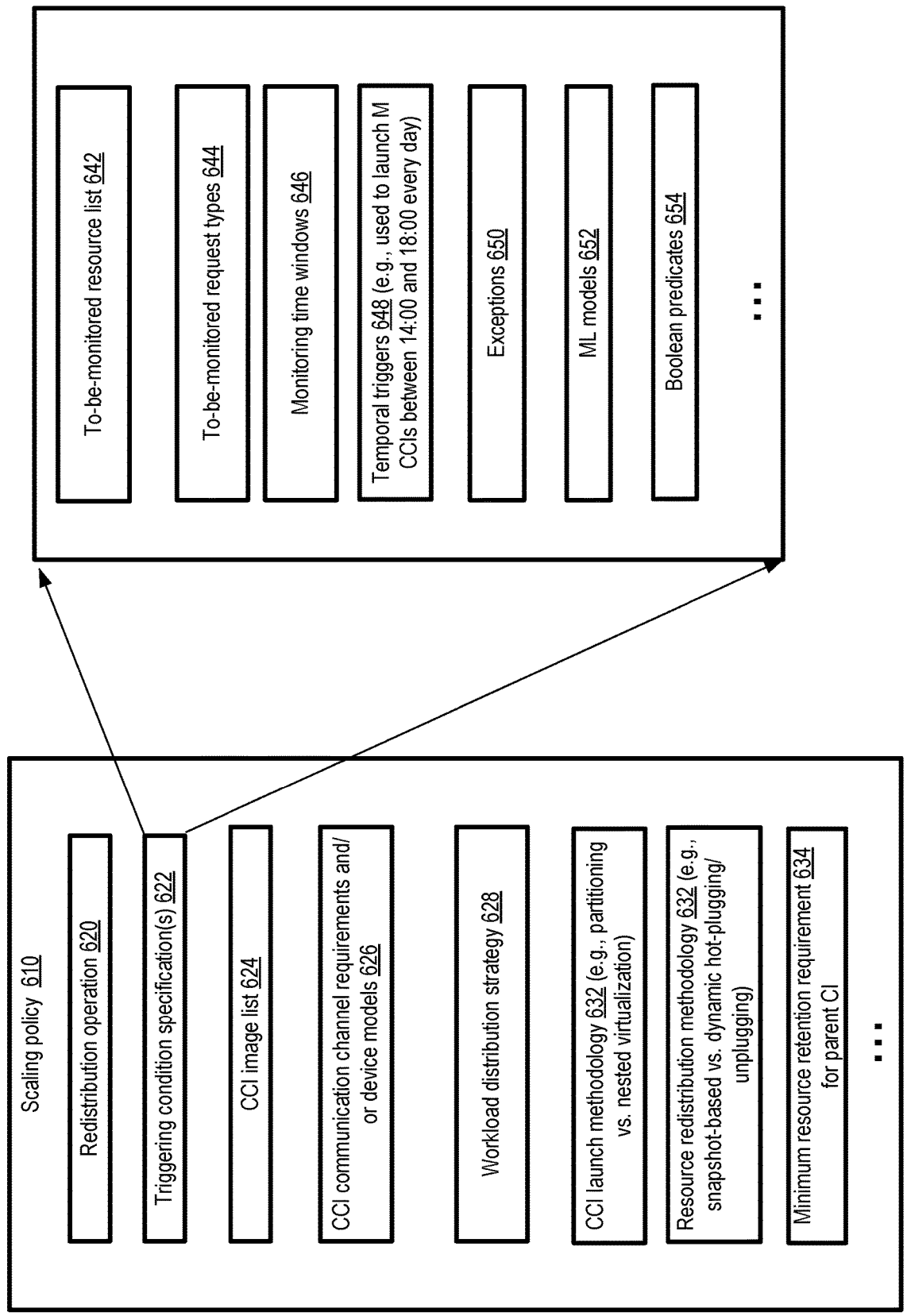
FIG. 6 illustrates example elements of a local scaling policy which may be used for managing compute instances at a virtualization host, according to at least some embodiments.

FIG. 6 illustrates example elements of a local scaling policy which may be used for managing compute instances at a virtualization host, according to at least some embodiments. In at least some embodiments, a client of a virtualized computing service (VCS) similar in features and functionality to VCS 110 of FIG. 1 may indicate at least some of the elements of such a policy via one or more programmatic interfaces implemented by the VCS. In other embodiments, default values for one or more of the policy elements may be used at the VCS if a client does not indicate non-default values. In one embodiment, the VCS may provide, via programmatic interfaces, one or more mechanisms enabling clients to select elements of a scaling policy—e.g., drop-down menus for selecting resources to be monitored, time windows during which the resources should be monitored, and the like may be provided to VCS clients via a graphical or web-based interface.

A scaling policy 610 may include one or more specification(s) 622 of triggering conditions for a particular type of resource redistribution action 620 (e.g., the creation of one or more new child compute instance (CCIs), the allocation of additional resources to one or more CCIs, the termination of one or more CCIs, and so on) in the depicted embodiment. In some cases, the evaluation of the triggering condition 622 may involve examining one or more metrics, such as resource utilization levels of one or more resources or arrival rates of various types of service requests directed to the family of compute instances for which the scaling policy 610 is to be applied. As such, for a given triggering condition specification, a list 642 of a to-be-monitored resources and/or a list 644 of request types whose arrival rates or completion rates are to be tracked may be indicated in some embodiments. For example, the to-be-monitored resources may include some combination of CPUs/cores, graphics processing units (GPUs), application-specific processing units (e.g., processors optimized for specific types of machine learning tasks), memory, persistent storage, network devices, and so on. In some cases, a client may indicate that only the metrics collected during a particular time window 646 (e.g., the most recent M minutes or S seconds) be used for evaluating a triggering condition. The specific logical predicate(s) 654 to be evaluated to determine whether the redistribution operation 620 should be initiated may be indicated in the triggering condition specification in various embodiments. For example, the logical equivalent of "launch a new CCI with resource set S1 if the arrival rate for requests of type R1 exceeds N requests/second over the most recent S1 seconds, or if the CPU utilization level of the parent CI exceeds X % over the most recent S2 seconds" may be specified using the combination of a redistribution operation element 620 (which indicates that the new CCI is to be launched) and a triggering condition specification element 622.

In some embodiments, one or more time-based or temporal triggers 648 may be indicated in a scaling policy if desired by the VCS client. For example, a client may be able to predict that a set of CCIs is likely to be needed during approximately the same time window every day, so temporal triggers indicating that certain resource redistribution operations are to be initiated during such time windows may be indicated in the scaling policy 610.

In at least one embodiment, a VCS client may indicate one or more exceptions 650 which are to be taken into account when determining whether a given resource redistribution should actually be performed as a result of evaluating a triggering condition 622. Such an exception may, for example indicate that a redistribution operation that would otherwise be triggered by the Boolean predicates 654 of the triggering condition specification is not to be performed if more than K similar redistribution operations have been performed during the past T minutes, or if a prediction from a machine learning model 652 indicates that the redistribution is likely to have to be reversed or un-done within the next M minutes. In some embodiments, instead of or in addition to specifying Boolean predicates to be used for scheduling redistribution operations 620, output from one or more machine learning models 652 (which may have been trained to predict resource utilization levels and/or request arrival rates) may be used to decide if and when a redistribution operation should be initiated.

A list of machine images 624 to be used for launching new CCIs may be indicated in the scaling policy in some embodiments. These may, for example, include custom images created by the VCS client, and may differ from the machine images corresponding to pre-defined categories of compute instances supported by the VCS.

In the depicted embodiment, requirements 626 for setting up communication channels and/or virtual device models for any of the CCIs launched as a result of a redistribution operation may be indicated in the scaling policy. A strategy 628 indicating how requests of various types are to be distributed among CCIs created as a result of the redistribution (e.g., whether randomized load balancing is to be used, or some other load balancing strategy is to be used) may be included in the scaling policy 610 in some embodiments. If one or more CCIs is to be launched, and multiple launch methodologies such as nested virtualization or custom instance partitioning are supported at the virtualization host at which the scaling policy 610 is applied, the launch methodology 632 to be used for the CCIs may be indicated in various embodiments.

A number of different techniques for allocating and de-allocating resources may be supported at some virtualization hosts of the VCS in the depicted embodiment, such as memory ballooning, dynamic un-plugging or plugging of processors, snapshot based resource modifications of the kind discussed in the context of FIG. 4, and so on. The specific resource redistribution methodology 632 to be used may be indicated in an element of the scaling policy in some embodiments. In at least one embodiment, a client may desire that the set of resources to be retained for use by the parent CI should not fall below a specified minimum (although some of the resources allocated to the parent CI may be set aside for use by CCIs), and the minimum resource retention requirement 634 for the parent CI may be indicated in the scaling policy 610. A scaling policy 610 may include one or more other elements not shown in FIG. 6 in some embodiments, while some of the elements shown in FIG. 6 may not be required in other embodiments. In one embodiment, a client may include, within a scaling policy, an indication of the extent to which resources of one or more types (virtual processors, memory, etc.) may be overcommitted when allocating subsets of a parent CI's resources to a CCI, for example. In some embodiments, respective scaling policies 610 may be defined for each type of redistribution operation desired; in other embodiments, a single scaling policy 610 may indicate several different types of redistribution operations to be performed, and the triggering conditions for each such type of redistribution operation.

Example Custom Instance Partitioning

Figure 7:
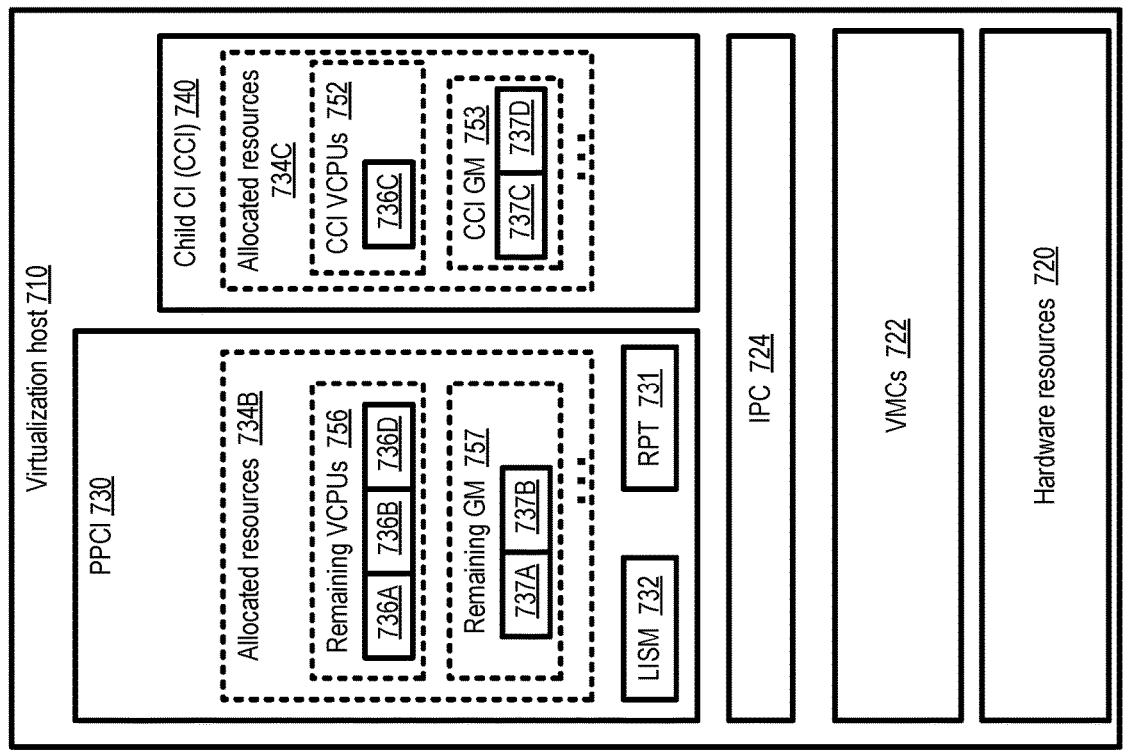
FIG. 7 illustrates an example re-distribution of a subset of resources of a parent compute instance using a customized instance partitioning methodology, according to at least some embodiments.
Figure 7:
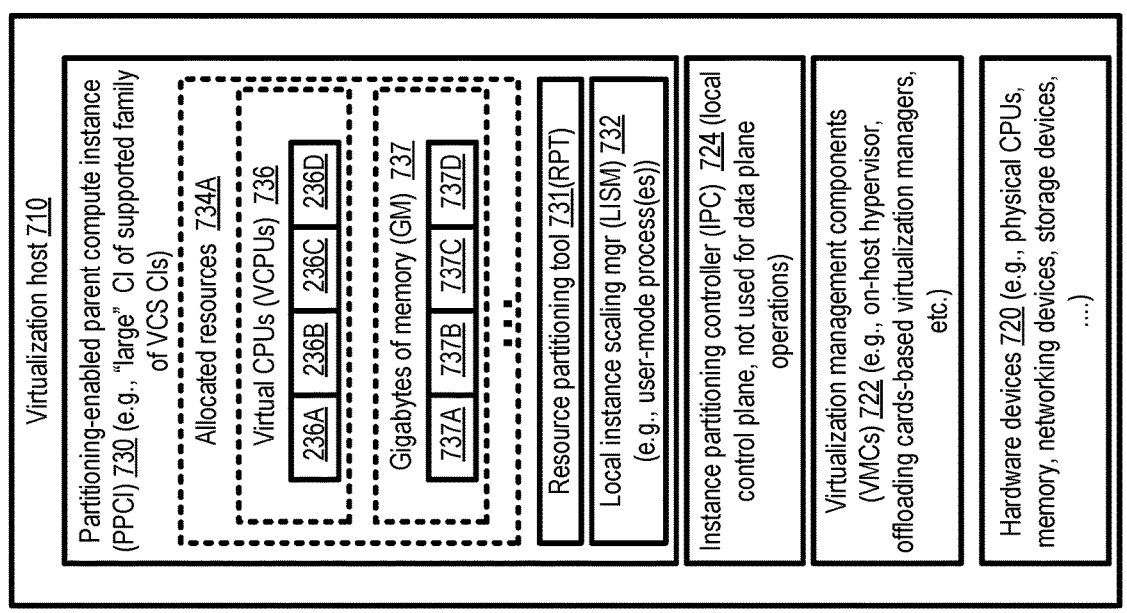

As mentioned earlier, in some embodiments a technique referred to as customized instance partitioning (which does not require multiple levels of virtualization managers such as hypervisors) may be employed to set up child compute instances, while in other embodiments nested virtualization techniques which do utilize multiple hypervisors may be used. FIG. 7 illustrates an example re-distribution of a subset of resources of a parent compute instance using a customized instance partitioning methodology, according to at least some embodiments. In the depicted example scenario, a partitioning-enabled parent compute instance (PPCI) is set up at a virtualization host 710. The PPCI 710 may, for example, be instantiated in response to a programmatic request from a VCS client to set up a "large" compute instance selected from a family of pre-defined instance categories that includes "large", "medium" and "small" compute instances. The virtualization host 710 may include a set of hardware devices 720 including physical CPUs, memory, networking devices such as network interface cards (NICs), storage devices, and so on. In some embodiments, virtualization management components (VMCs) 722 of the virtualization host 720 may include an on-host hypervisor (i.e., a hypervisor which runs on the CPUs of the host). In one embodiment, at least a subset of virtualization management tasks may be performed at one or more offloading cards so as to enable more of the processing capacity of the host 720 to be dedicated to client-requested compute instances—e.g., cards connected via PCI or PCIe to the physical CPUs and other components of the virtualization host may be used for some virtualization management components. Such an offloading card of the host can include one or more CPUs that are not available to customer instances, but rather are dedicated to instance management tasks such as virtual machine management, input/output virtualization, instance health monitoring, and the like.

In various embodiments, one or more instance partitioning controllers (IPCs) 724 may be set up at virtualization hosts 720 that are to be used for custom partitioning of compute instances. Other virtualization hosts, which are used for baseline or non-partitioned compute instances may not require such IPCs in at least some embodiments. A given IPC 724 may comprise, for example, one or more processes or threads launched by the VMCs 722 in some implementations. An IPC 724 may perform some operations for child compute instances (CCIs) analogous to those performed for PPCIs at the primary control plane of the VCS. For example, just as some validation tasks may be performed at the primary control plane to ensure that sufficient resources are available at the VCS for a requested PPCI before the PPCI is launched, the IPC may perform validation tasks to ensure that sufficient free resources are available for a requested CCI before the CCI is launched. Note that some types of operations performed at the primary control plane need not be replicated at the IPC in at least some embodiments—for example, because the host at which a CCI is to be launched is known (by definition, a CCI is launched at the same host as its PPCI), provisioning of a host may not be required from the IPC, while such provisioning may be required from the primary control plane for a PPCI in at least some cases. In at least some embodiments, an IPC may only be used for control plane tasks related to a CCI—e.g., to approve the request to launch the CCI or a request to terminate the CCI. As such, the IPC may not be involved in data plane operations of the CCI in such embodiments; once the CCI is launched, the CCI may perform its computations without interacting with the IPC 724, using the VMCs 722 as needed to access hardware devices. Note that some functionality implemented at an IPC 724 (e.g., participation in the setting up of local communication channels) may not be required at the primary control plane in various embodiments—thus, IPC functionality may not necessarily represent a strict subset of primary control plane functionality.

In addition to a local instance scaling manager (LISM) 732, a resource partitioning tool (RPT) 731 may be instantiated within the PPCI 730 in the depicted embodiment. The RPT 731 may implement programmatic interfaces which can be used by the VCS client on whose behalf the PPCI 730 is set up to submit requests pertaining to CCIs, to view status information of the CCIs, and so on. In at least some embodiments, the RPT 731 and/or the LISM 732 may comprise one or more user-mode processes. In some embodiments, the VCS client may submit a scaling policy to the RPT 731, and the RPT may in turn provide the scaling policy to the LISM 732. In some embodiments, if/when a client wishes to manually request a new CCI (i.e., in addition to any CCIs that may be created automatically by the LISM), a request for the CCI may be submitted to the RPT, and the RPT may orchestrate the establishment of the CCI with the help of the IPC 724 and the VMCs 722.

In the example scenario shown in FIG. 7, the set of resources 734A initially allocated to PPCI 730 may include virtual CPUs 736A-736D as well as four gigabytes of memory 737A-737D. The number of virtual CPUs 736 and the amount of memory 737 allocated to the PPCI 730 may be based on the category (e.g., the "large" compute instance category) indicated by the VCS client in a launch request for the PPCI which was sent to the primary VCS control plane.

When the LISM determines that a CCI is to be launched based on a triggering condition of a scaling policy (similar to scaling policy 610 discussed in the context of FIG. 6), a launch request for the CCI may be sent to the IPC 724. The CCI launch request may indicate various parameters and properties of the requested CCI, including for example the subset of resources of the PPCI which are to be designated for use by the CCI. The IPC 724 may ensure, using local resource allocation metadata maintained at the virtualization host 710 (e.g., at the VMCs 722), that there are sufficient resources available for the CCI and/or perform other validation tasks pertaining to the CCI request. If the request is approved/validated, the IPC may send one or more messages or commands to the VMCs 722 to launch the requested CCI and allocate a subset of resources 734 to the newly-created CCI. In at least some embodiments, components of the PPCI's operating system may also be involved in the allocation of CCI resources—e.g., the PPCI operating system may identify and set aside memory regions which can later be allocated to the CCI. In the depicted example scenario, one VCPU 736C is included in the set of CCI VCPUs of allocated resources 734C of CCI 740 by the VMCs 722, and two gigabytes of memory 737C and 737D are included in the CCI GM 753 of CCI 740. The resources 734B that remain available for the PPCI 730 include three VCPUs (736A, 736B and 736D) (labeled remaining VCPUs 756) and two gigabytes of memory 737A and 737B (labeled remaining GM 757). Other resources and/or software devices originally assigned to the PPCI may also be allocated for use by, or transferred to, the CCI 740 in some embodiments. New software devices may be created for the CCI 740 based on a device model specification indicated by the VCS client in the scaling policy in some embodiments. In at least some embodiments, the subset of resources 734C allocated to the CCI may not be accessible or usable from the PPCI during the lifetime of the CCI.

CCI 740 may not include an RPT or LISM of its own in the depicted embodiment; as such, resources 734C may not be further partitioned to create additional CCIs from CCI 740. In other embodiments, CCIs may also include RPTs and/or LISMs, and a multi-level hierarchy of CCIs may be created if desired based on the policies indicated by VCS clients. In at least some embodiments, if/when a given CCI is terminated, its allocated resources may be returned to its PPCI. In one embodiment, the allocated resources for a given CCI may instead be retained in a pool for use for additional CCIs, instead of being returned to the PPCI.

Figure 8:
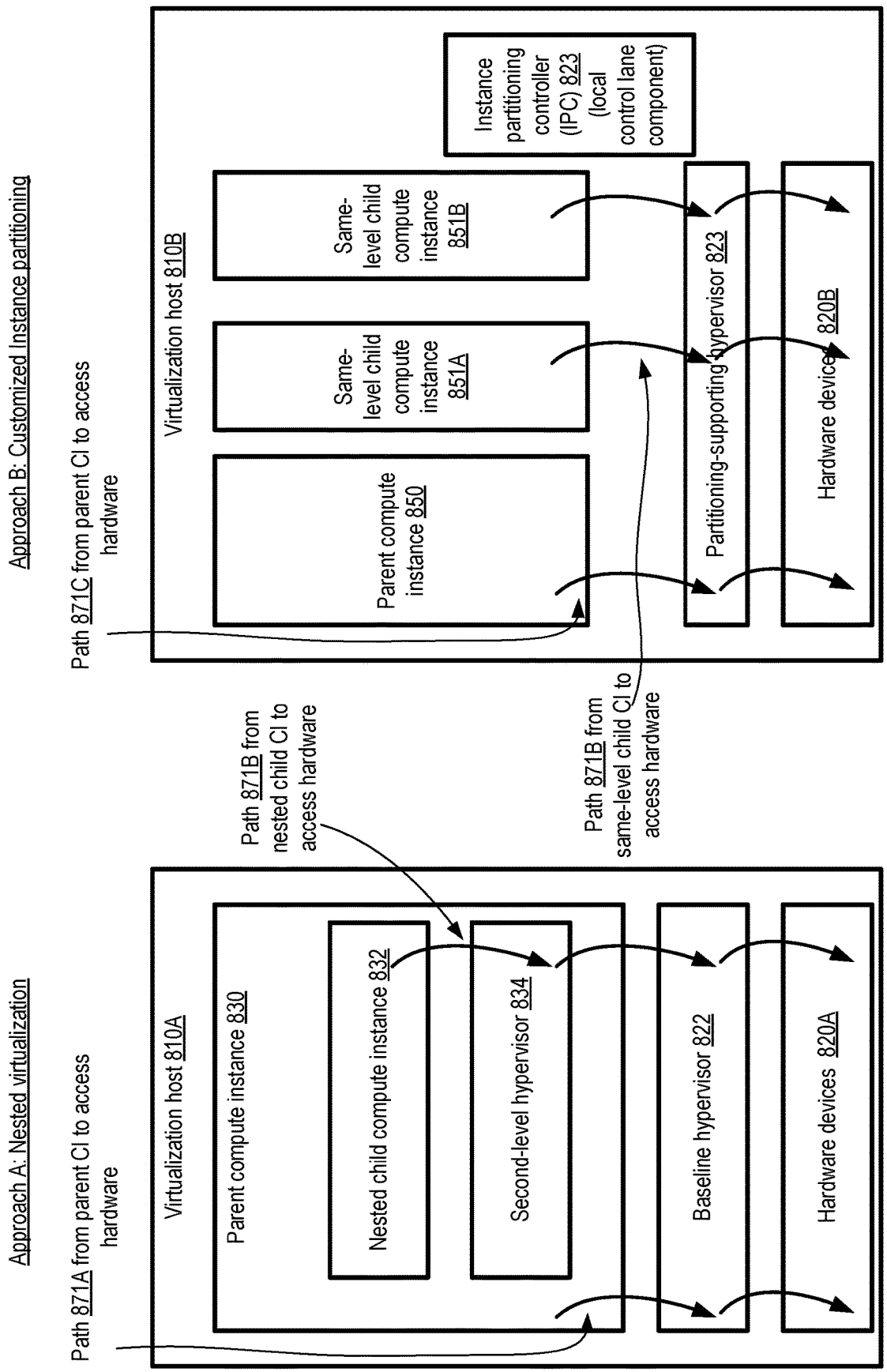
FIG. 8 illustrates an overview of differences between nested virtualization techniques and customized instance partitioning, according to at least some embodiments.

FIG. 8 illustrates an overview of differences between nested virtualization techniques and customized instance partitioning, according to at least some embodiments. In Approach A, representing the nested virtualization scenario, virtualization host 810A comprises a set of hardware devices 820A and baseline hypervisor 822 which does not support custom partitioning of compute instances of the kind discussed in the context of FIG. 7. A parent compute instance 830 may be launched by the baseline hypervisor 822. In order to create a nested compute instance 832, a second-level hypervisor 834 may be instantiated within the parent compute instance 830. The second-level hypervisor 834 may for example comprise one or more processes within the address space of the parent compute instance 830 in some implementations. When a process within the parent compute instance 830 has to access a hardware device 820A, a software pathway similar to 871A may be used—an access request may be sent to the baseline hypervisor 822, and the baseline hypervisor 822 in turn may access the hardware device and provide the response obtained from the hardware device back to the process. In contrast to path 871A, which comprises two "hops", a three-hop path similar to 871B may be traversed for a process within the nested compute instance 832 to access hardware devices 820A, with both the second-level hypervisor 834 and the baseline hypervisor 822 being included in the path. This extra level of indirection may result in performance overhead in at least some implementations; as a result, applications running with a nested compute instance 832 may not necessarily be as performant as similar applications running within the parent compute instance 830 when nested virtualization approach A is used.

In Approach B, representing customized instance partitioning, virtualization host 810B includes similar hardware devices 820B and a partitioning-supporting hypervisor (similar in features and functionality to VMCs 722 of FIG. 7). Parent compute instance 850 launched at virtualization host 810B does not require a second-level hypervisor which acts as an intermediary along the path between child compute instances and the hardware devices 820B. After child compute instances 851A and 851B are created, the paths 871D to access hardware devices from the CCIs 851 are similar in length or hops to the path 871C for accessing hardware devices from parent compute instance 850. As a result, applications running within the CCIs 851B may be as performant as similar applications running within parent compute instance 850 when customized instance partitioning is used in at least some embodiments. A local control plane component such as instance partitioning controller 823 (similar in functionality to IPC 724 of FIG. 7) may be launched at virtualization host 810B to facilitate CCI management without using multiple hypervisors. Note that the IPC, which may be used during the setup of the CCIs and for handling administrative operations associated with the CCIs, may not participate in, or be used for, the data plane operations performed by applications running at the CCIs and/or the parent compute instance in various embodiments.

Example Programmatic Interactions

Figure 9:
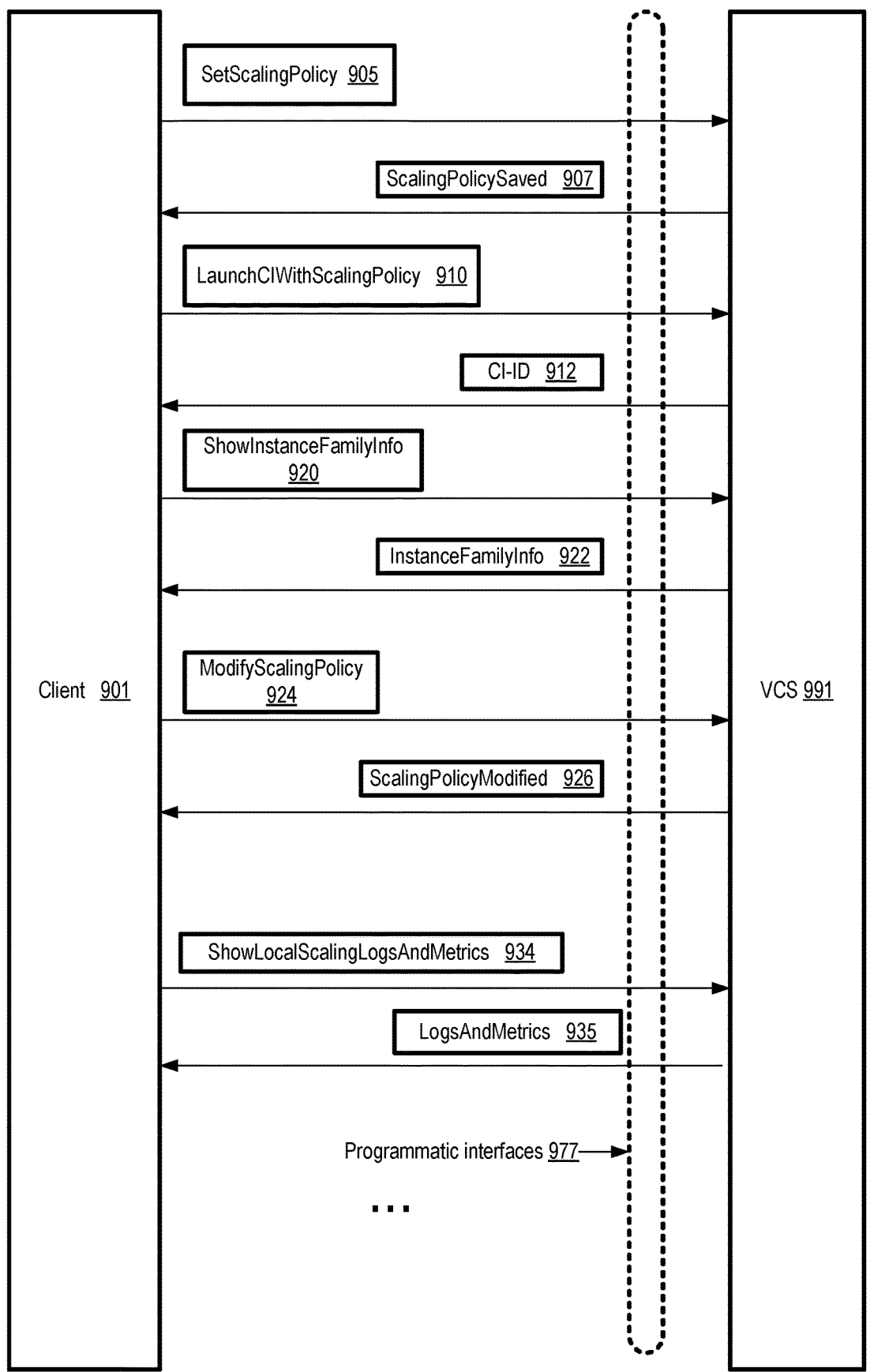
FIG. 9 illustrates example programmatic interactions related to the automated local scaling of compute instances, according to at least some embodiments.

FIG. 9 illustrates example programmatic interactions related to the automated local scaling of compute instances, according to at least some embodiments. One or more programmatic interfaces 977, such as a web-based console, command-line tools, APIs, graphical user interfaces and the like may be implemented by a VCS 991 to enable clients 901 to submit various types of requests pertaining to local scaling policy-based resource redistribution operations and to receive corresponding responses in the depicted embodiment. In some cases, the requests may be sent to the primary VCS control plane (e.g., if a common scaling policy is to be applied at numerous compute instances on behalf of the client); in other cases, the requests may be sent to a local instance scaling manager (LISM) of the kind introduced above.

A VCS client 901 may specify a local scaling policy to be used to manage resources associated with an instance family using a SetScalingPolicy request 905 submitted via programmatic interfaces 977 in the depicted embodiment. In response, the VCS 991 may perform one or more verification/validation operations in at least some embodiments, e.g., to check that the syntax of the scaling policy is correct, and that it does not contain any unsupported elements. If the policy is found acceptable, it may be stored in metadata repository and if need, propagated to a fleet of compute instances indicated in the SetScalingPolicy request. The scaling policy may, for example, comprise at least some elements similar to those discussed in the context of FIG. 6—e.g., it may indicate the types of scaling or redistribution actions to be performed, descriptors or specifications of the triggering conditions for such actions, and so on. After the policy has been stored, the VCS may send a ScalingPolicySaved message 907 to the client in some embodiments.

To request the launch of a compute instance for which a scaling policy is to be enforced, a LaunchCIWithScalingPolicy request 910 may be submitted via programmatic interfaces 977 in the depicted embodiment. A compute instance with a local instance scaling manager may be launched in response to such a request, and an identifier of the launched CI may be sent back to the client in a CI-ID message 912. In some cases, the client may indicate the particular scaling policy to be used in the message 910; in other cases, the VCS may determine which scaling policy is to be used based on the metadata saved earlier in response to a SetScalingPolicy request 905.

In at least one embodiment, a VCS client may request information about the family of instances associated with a given parent or child compute instance by submitting a ShowInstanceFamilyInfo message 920. The ShowInstanceFamilyInfo message may, for example, include an identifier of a parent CI or one or more child CIs; in response, status and other information pertaining to the parent CI and all of its current CCIs may be provided or displayed via one or more InstanceFamilyInfo messages 922. Such information may for example include identifiers of each of the CIs of the family, an indication of resources allocated for (or thus far consumed by) the individual CIs, the durations for which the CIs have been running, and so on. In one embodiment, the CCIs may be represented as child processes of the parent CI in response to a ShowInstanceFamilyInfo request 920. For example, in a manner analogous to the way the Linux "ps" command and its equivalents provide information about the processes running within an operating system, the ShowInstanceFamilyInfo request may cause a view of metrics of respective resource usages of one or more CCIs of a parent CI, with the CCIs being presented as respective processes running within the parent CI. Such a presentation of CCI information may be provided regardless of whether the CCIs were launched using nested virtualization or the instance partitioning approach in at least some embodiments.

A ModifyScalingPolicy request 924 may be used to change the parameters of an existing scaling policy of, or apply an entirely new scaling policy to, one or more compute instances in the depicted embodiment. In response, after validating the changes, the VCS may transmit a ScalingPolicyModified response message 926 to the client.

A client may obtain collected records about the automated local scaling operations performed with respect to a given instance family by submitting a ShowLocalScalingLogsAndMetrics request 934 via programmatic interfaces 977 in the depicted embodiment. In response, a view of the specific auto scaling operations initiated based on the policy which was selected by the client may be presented in the form of one or more LogsAndMetrics messages 935. Other types of programmatic interactions related to automated local scaling of compute instances may be supported in some embodiments than those shown in FIG. 9.

A wide variety of applications may be implemented using CCIs launched automatically based on client-specified scaling policies in different embodiments. In one embodiment, a CCI may be configured primarily to perform sensitive computations that require a higher security level than computations run within the parent CI (or within other CCIs with the same parent CI). A set of lower trust-level application processes may be run within the parent CI, while higher trust-level application processes may be run within an isolated CCI launched with the help of an LISM. Configuration settings of the CCI may prohibit network communications between the CCI and any endpoints in some embodiments, e.g., to eliminate network-based attacks which may otherwise potentially allow security artifacts used at the CCI to be accessed by attackers. Similarly, in at least one embodiment, access to persistent storage devices may also be prohibited for the CCI to enhance security, so that sensitive artifacts cannot be copied from persistent storage by attackers. In various embodiments, a local communication channel (LCC) (e.g., comprising one or more shared memory buffers) may be used to interact with an isolated CCI. In one implementation, a communication intermediary process may be launched within the parent CI, and communications to/from the otherwise isolated CCI may pass through the intermediary process. For example, a secure communication session similar to a Transport Layer Security (TLS) session may be set up, with the help of the intermediary process, between a source of a security artifact (such as a key management service of a provider network) and the CCI to enable the transfer of security artifacts to the isolated CCI. In some cases, isolated CCIs may be terminated automatically after their secure computations are completed, or after the expiration of a timeout interval, to further reduce the probability of leakage of sensitive data.

In some embodiments, CCIs may be launched specifically to run applications developed by third parties, while the parent CI may be used to run applications developed by the VCS client on whose behalf the parent CI was launched. In one embodiment, software containers may be used to run one or more applications within CCIs. In some embodiments, one or more CCIs may be launched to act as a communication hub or intermediary between one or more other CIs of its family, and other endpoints. In at least some embodiments, a CCI may be set up to run applications implementing shared tasks which may be required with respect to various other compute instances, such as logging, profiling, metrics collection etc.

Methods for Automated Local Scaling of Compute Instances

Figure 10:
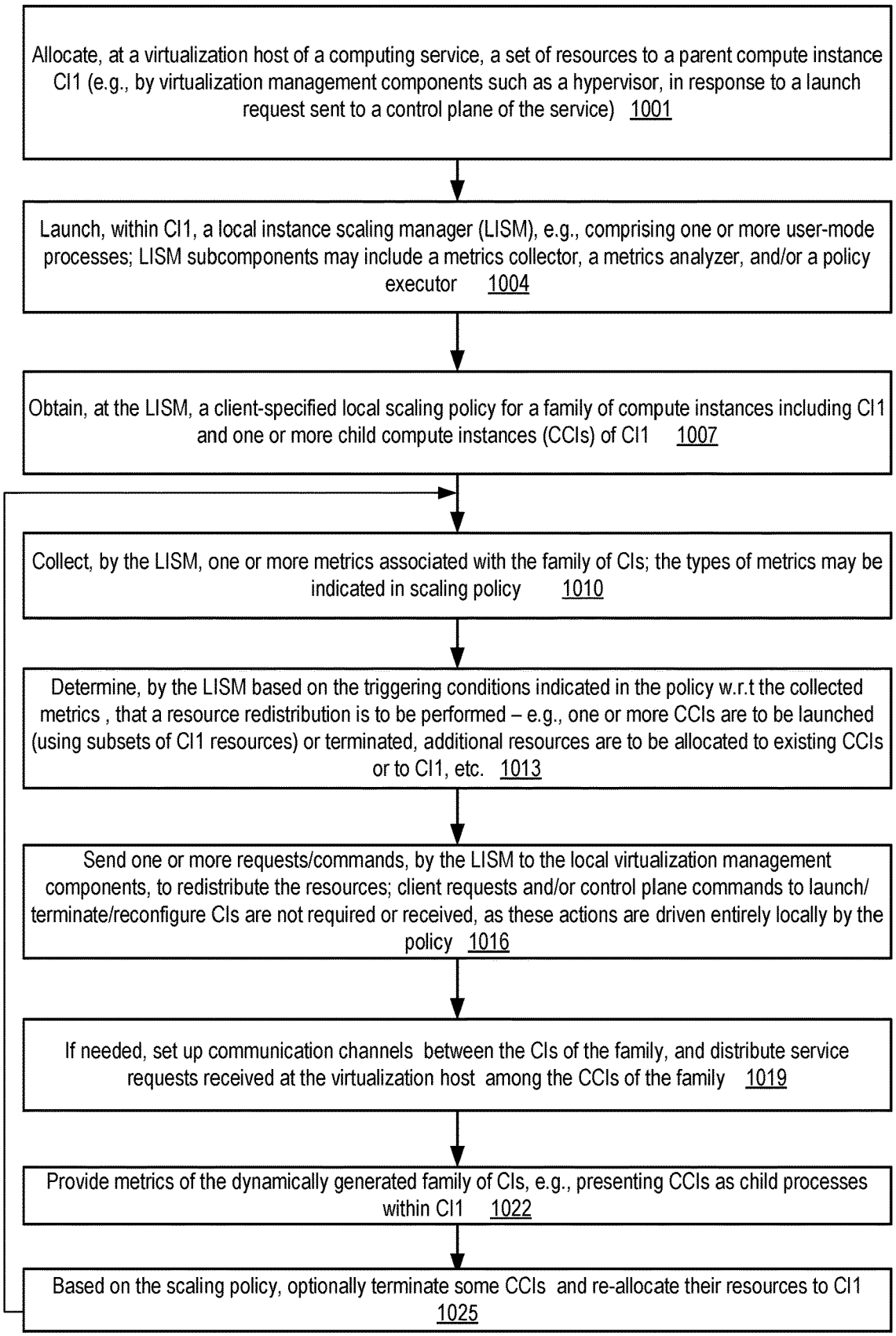
FIG. 10 is a flow diagram illustrating aspects of operations that may be performed to implement automated policy-driven local scaling of compute instances, according to at least some embodiments.

FIG. 10 is a flow diagram illustrating aspects of operations that may be performed to implement automated policy-driven local scaling of compute instances, according to at least some embodiments. As shown in element 1001, a set of resources may be allocated to a parent compute instance CI1 at a virtualization host of a computing service similar to VCS 110 of FIG. 1. The resources (which may include, for example, one or more virtual CPUs, a portion of memory, and so on) may be allocated by virtualization management components such as a hypervisor, e.g., in response to an instance launch request directed to the control plane of the computing service.

Within CI1, a local instance scaling manager (LISM) may be launched in at least some embodiments (element 1004). The LISM may, for example, include one or more user-mode processes and/or one or more kernel-mode components in some embodiments. The LISM in turn may comprise sub-components such as a metrics collector, a metrics analyzer and/or a policy executor in various embodiments.

A client-specified local scaling policy may be obtained at the LISM in the depicted embodiment (element 1007). The policy may for example indicate rules and triggering conditions for various types of resource redistribution operations to be performed with respect to a family of compute instances which includes CI1 and one or more child compute instances (CCIs) of CI1. Note that a CCI may not necessarily have been created at the time that the scaling policy is received and activated in some cases, and the policy may lead to the instantiation of one or more CCIs when triggering conditions are satisfied.

The LISM may collect or obtain metrics associated with the family of CIs over time in the depicted embodiment (element 1010). The types of metrics to be collected (e.g., the set of resources whose utilization levels, response time levels, request throughput levels or the like which are to be monitored, and/or the types of application requests whose arrival or completion rates are to be monitored) may be indicated in the scaling policy.

Based at least in part on the collected metrics, triggering conditions and/or on other predicates indicated in the policy, the LISM may determine that a resource redistribution operation is to be performed with respect to the instance family comprising CI1 (element 1013). For example, a decision to launch one or more CCIs may be made (with a subset of CI1's resources being allocated to the CCIs), a decision to change resource allocations of one or more existing CCIs or CI1 may be made, and so on in the depicted embodiment.

In accordance with the decision to redistribute the resources, one or more requests or commands may be sent by the LISM to one or more virtualization management components of the virtualization host, e.g., either directly or via an intermediary such as an instance partitioning controller in the depicted embodiment (element 1016). Note that such policy-driven requests may not require client participation in the depicted embodiment; clients may not have to be concerned with sending specific commands for launching or terminating instances other than CI1, or for resource redistributions among the instances of the family being managed using the policy. In addition, commands or requests from the control plane of the VCS or computing service may not be required in the depicted embodiment; the resource redistributions may be driven and managed entirely locally (within the virtualization host) once the policy has been obtained, without requiring communications from external entities.

If needed, communication channels (e.g., using local shared memory buffers for message passing) may be set up for the CCIs which may have been launched based on the policy (element 1019). Requirements for such channels may also be indicated in the scaling policy in at least some embodiments.

Metrics and/or status information pertaining to the family of compute instances may be provided via programmatic interfaces to the client on whose behalf the instance family is configured in various embodiments. For example, in some embodiments, the CCIs of the family may be presented as the equivalent of processes running within the parent CI.

Based at least in part on the scaling policy, in some embodiments one or more CCIs of CI1 may be terminated at various points in time, and the resources that were allocated to the terminated CCIs may be returned or re-allocated to CI1 (element 1025). The LISM may continue monitoring various metrics and repeat operations similar to those of elements 1010 onwards if and when triggering conditions indicated in the scaling policy are satisfied.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The techniques described above, of automatically redistributing resources allocated to a parent compute instance at a virtualized computing service based on client-specified rules, without requiring communications with the control plane of the service and without requiring clients to submit requests for each redistribution, may be useful in a variety of scenarios. As more and more different types of applications are migrated to provider network environments, the set of pre-defined compute instance categories of the provider network may not necessarily match the requirements of at least some clients very closely. By utilizing the described efficient techniques for automatically setting up customized compute instances locally, tearing down such compute instances when they are no longer required, and adjusting the resource combinations allocated to the newly-created instances based on changing conditions, clients may be able to satisfy the requirements of time-varying application workloads more easily.

Illustrative Computer System

Figure 11:
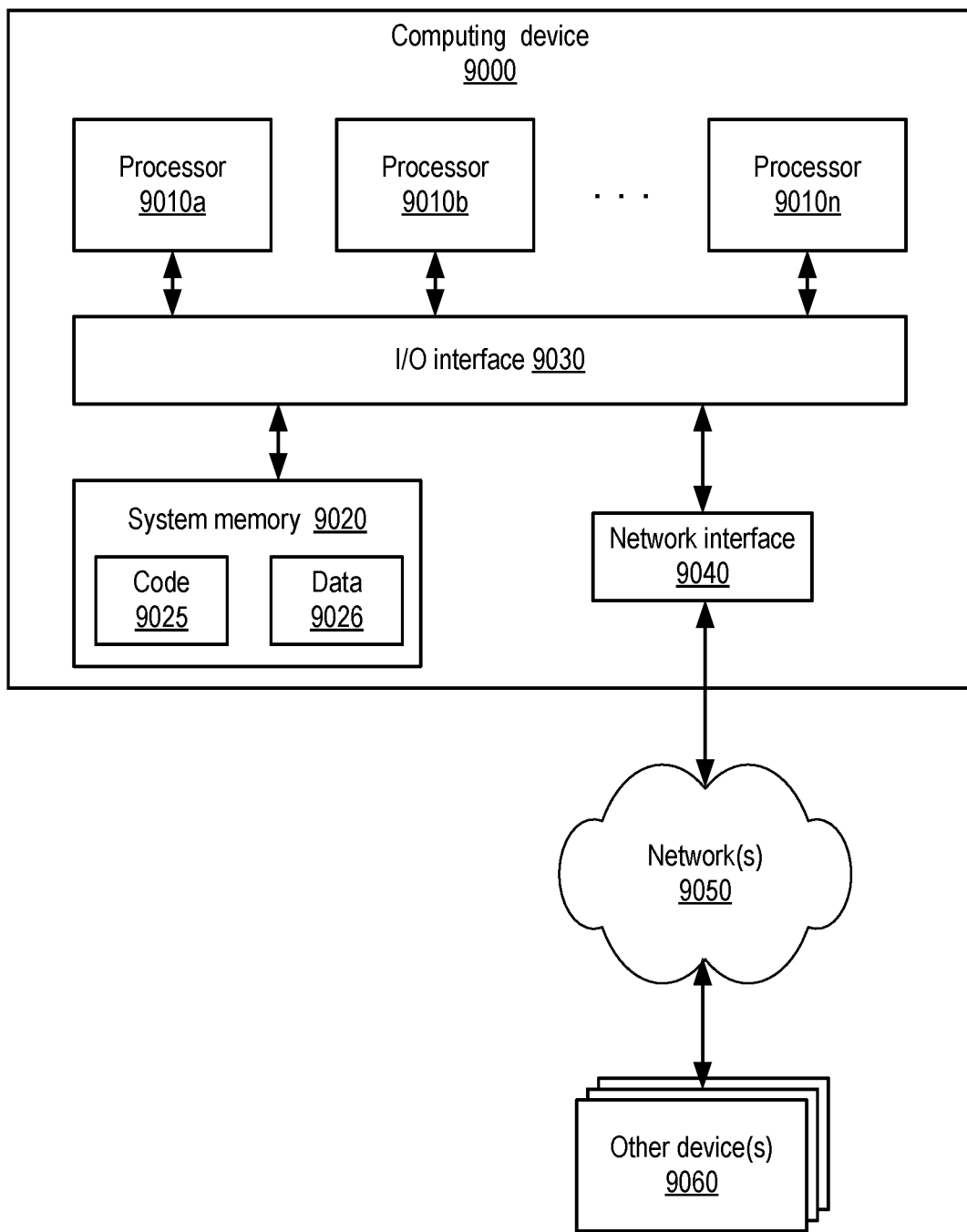
FIG. 11 is a block diagram illustrating an example computing device that may be used in at least some embodiments.

In at least some embodiments, a server that implements one or more of the techniques described herein, including for example hypervisors and compute instances with local instance scaling managers at virtualization hosts, control plane and/or data plane components of network-accessible services and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electro-magnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
launching, by a hypervisor running at a host of a cloud computing environment, a first virtual machine at the host, wherein a first set of resources of the host is allocated to the first virtual machine by the hypervisor;
receiving a request at the hypervisor for a second virtual machine, wherein the request is received from the first virtual machine; and
launching, by the hypervisor in response to the request, a second virtual machine at the host, wherein a subset of the first set of resources is allocated to the second virtual machine by the hypervisor using hot plugging.

2. The computer-implemented method as recited in claim 1, further comprising:
generating, at the first virtual machine, the request for the second virtual machine in accordance with a scaling policy indicated by a client of the cloud computing environment.

3. The computer-implemented method as recited in claim 1, further comprising:
collecting one or more metrics, wherein the request for the second virtual machine is generated at the first virtual machine based at least in part on the one or more metrics.

4. The computer-implemented method as recited in claim 3, wherein the one or more metrics comprise one or more of: (a) a compute resource usage metric, (b) a memory usage metric, (c) a network usage metric, (d) a storage device usage metric, (e) a request workload metric, (f) a usage metric of a graphics processing unit (GPU), or (g) a usage metric of an application-specific processing unit.

5. The computer-implemented method as recited in claim 1, further comprising:
receiving, at the first virtual machine, a service request;
transmitting the service request from the first virtual machine to the second virtual machine; and
processing the service request at the second virtual machine.

6. The computer-implemented method as recited in claim 1, further comprising:
obtaining, at the cloud computing environment via one or more programmatic interfaces, an indication of a machine image to be employed for the second virtual machine, wherein the second virtual machine is launched using the machine image.

7. The computer-implemented method as recited in claim 1, further comprising:
causing a snapshot of state information of the second virtual machine to be stored; and
launching, by the hypervisor, a third virtual machine using at least the snapshot.

8. A system, comprising:
one or more computing devices;
wherein the one or more computing devices include instructions that upon execution on or across the one or more computing devices:
launch, by a hypervisor running at a host of a cloud computing environment, a first virtual machine at the host, wherein a first set of resources of the host is allocated to the first virtual machine by the hypervisor;
receive a request at the hypervisor for a second virtual machine, wherein the request is received from the first virtual machine; and
launch, by the hypervisor in response to the request, a second virtual machine at the host, wherein a subset of the first set of resources is allocated to the second virtual machine by the hypervisor using hot plugging.

9. The system as recited in claim 8, wherein the one or more computing devices include further instructions that upon execution on or across the one or more computing devices:
generate, at the first virtual machine, the request for the second virtual machine in accordance with a scaling policy indicated by a client of the cloud computing environment.

10. The system as recited in claim 8, wherein the one or more computing devices include further instructions that upon execution on or across the one or more computing devices:
collect one or more metrics, wherein the request for the second virtual machine is generated at the first virtual machine based at least in part on the one or more metrics.

11. The system as recited in claim 10, wherein the one or more metrics comprise one or more of: (a) a compute resource usage metric, (b) a memory usage metric, (c) a network usage metric, (d) a storage device usage metric, (e) a request workload metric, (f) a usage metric of a graphics processing unit (GPU), or (g) a usage metric of an application-specific processing unit.

12. The system as recited in claim 8, wherein the one or more computing devices include further instructions that upon execution on or across the one or more computing devices:
receive, at the first virtual machine, a service request;
transmit the service request from the first virtual machine to the second virtual machine; and
process the service request at the second virtual machine.

13. The system as recited in claim 8, wherein the one or more computing devices include further instructions that upon execution on or across the one or more computing devices:
obtain, at the cloud computing environment via one or more programmatic interfaces, an indication of a machine image to be employed for the second virtual machine, wherein the second virtual machine is launched using the machine image.

14. The system as recited in claim 8, wherein the one or more computing devices include further instructions that upon execution on or across the one or more computing devices:

cause a snapshot of state information of the second virtual machine to be stored; and launch, by the hypervisor, a third virtual machine using at least the snapshot.

15. One or more non-transitory computer-accessible storage media storing program instructions that when executed on or across one or more processors:

launch, by a hypervisor running at a host of a cloud computing environment, a first virtual machine at the host, wherein a first set of resources of the host is allocated to the first virtual machine by the hypervisor;

receive a request at the hypervisor for a second virtual machine, wherein the request is received from the first virtual machine; and launch, by the hypervisor in response to the request, a second virtual machine at the host, wherein a subset of the first set of resources is allocated to the second virtual machine by the hypervisor using hot plugging.

16. The one or more non-transitory computer-accessible storage media as recited in claim 15, storing further program instructions that when executed on or across the one or more processors:

generate, at the first virtual machine, the request for the second virtual machine in accordance with a scaling policy indicated by a client of the cloud computing environment.

17. The one or more non-transitory computer-accessible storage media as recited in claim 15, storing further program instructions that when executed on or across the one or more processors:

collect one or more metrics, wherein the request for the second virtual machine is generated at the first virtual machine based at least in part on the one or more metrics.

18. The one or more non-transitory computer-accessible storage media as recited in claim 17, wherein the one or more metrics comprise one or more of: (a) a compute resource usage metric, (b) a memory usage metric, (c) a network usage metric, (d) a storage device usage metric, (e) a request workload metric, (f) a usage metric of a graphics processing unit (GPU), or (g) a usage metric of an application-specific processing unit.

19. The one or more non-transitory computer-accessible storage media as recited in claim 15, storing further program instructions that when executed on or across the one or more processors:

receive, at the first virtual machine, a service request;

transmit the service request from the first virtual machine to the second virtual machine; and process the service request at the second virtual machine.

20. The one or more non-transitory computer-accessible storage media as recited in claim 15, storing further program instructions that when executed on or across the one or more processors:

obtain, at the cloud computing environment via one or more programmatic interfaces, an indication of a machine image to be employed for the second virtual machine, wherein the second virtual machine is launched using the machine image.

\* \* \* \* \*